(12) United States Patent
Iwaji et al.

(10) Patent No.: US 10,644,627 B2
(45) Date of Patent: May 5, 2020

(54) CONTROL DEVICE OF SYNCHRONOUS ELECTRIC MOTOR, INTEGRATED MOTOR SYSTEM, PUMP SYSTEM, AND POSITIONING SYSTEM

(71) Applicant: HITACHI AUTOMOTIVE SYSTEMS, LTD., Ibaraki (JP)

(72) Inventors: Yoshitaka Iwaji, Tokyo (JP); Masaki Hano, Hitachinaka (JP); Naoki Okamoto, Hitachinaka (JP); Takeshi Umetsu, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/766,759

(22) PCT Filed: Oct. 7, 2016

(86) PCT No.: PCT/JP2016/079975
§ 371 (c)(1),
(2) Date: Apr. 6, 2018

(87) PCT Pub. No.: WO2017/061612
PCT Pub. Date: Apr. 13, 2017

(65) Prior Publication Data
US 2018/0287526 A1    Oct. 4, 2018

(30) Foreign Application Priority Data
Oct. 7, 2015    (JP) .................................. 2015-199040

(51) Int. Cl.
*H02P 6/21*        (2016.01)
*H02P 6/182*      (2016.01)
(Continued)

(52) U.S. Cl.
CPC ................ *H02P 6/21* (2016.02); *H02P 6/182* (2013.01); *H02P 6/187* (2013.01); *H02P 21/04* (2013.01); *H02P 2207/05* (2013.01)

(58) Field of Classification Search
CPC ........ H02P 6/21; H02P 6/182; H02P 2207/05; H02P 6/187; H02P 21/04
See application file for complete search history.

(56) References Cited

U.S. PATENT DOCUMENTS

2007/0018599 A1    1/2007 Yamamoto et al.
2009/0200971 A1    8/2009 Iwaji et al.
(Continued)

FOREIGN PATENT DOCUMENTS

JP    2000-201494 A      7/2000
JP    2000201494 A  *   7/2000
(Continued)

OTHER PUBLICATIONS

International Search Report dated Dec. 20, 2016 of the PCT International Application No. PCT/JP2016/079975.

*Primary Examiner* — Kawing Chan
*Assistant Examiner* — Bradley R Brown
(74) *Attorney, Agent, or Firm* — Volpe and Koenig, P.C.

(57) ABSTRACT

A control device of a synchronous electric motor includes: the synchronous electric motor with three-phase stator windings Y-connected; a detection unit that detects a neutral point potential which is a potential at a Y connection point; and an inverter that drives the synchronous electric motor. The control device of the synchronous electric motor which controls the synchronous electric motor using the inverter, includes a measurement mode in which the neutral point potential is detected in a state in which the synchronous electric motor is energized by an AC current and controls the (Continued)

synchronous electric motor based on a value of the neutral point potential detected in the measurement mode.

16 Claims, 27 Drawing Sheets

(51) Int. Cl.
*H02P 21/04* (2006.01)
*H02P 6/18* (2016.01)

(56) References Cited

U.S. PATENT DOCUMENTS

| | | | |
|---|---|---|---|
| 2010/0066284 | A1 | 3/2010 | Iwaji et al. |
| 2011/0234133 | A1 | 9/2011 | Hano et al. |
| 2013/0243625 | A1* | 9/2013 | Iwaji .................... H02P 6/18 417/410.1 |
| 2015/0069941 | A1* | 3/2015 | Iwaji .................... H02P 6/18 318/400.11 |

FOREIGN PATENT DOCUMENTS

| | | |
|---|---|---|
| JP | 2007-028869 A | 2/2007 |
| JP | 2009-189176 A | 8/2009 |
| JP | 2010-074898 A | 4/2010 |
| JP | 2012-010477 A | 1/2012 |
| WO | 2013/153657 A1 | 10/2013 |

* cited by examiner

[Fig. 1]
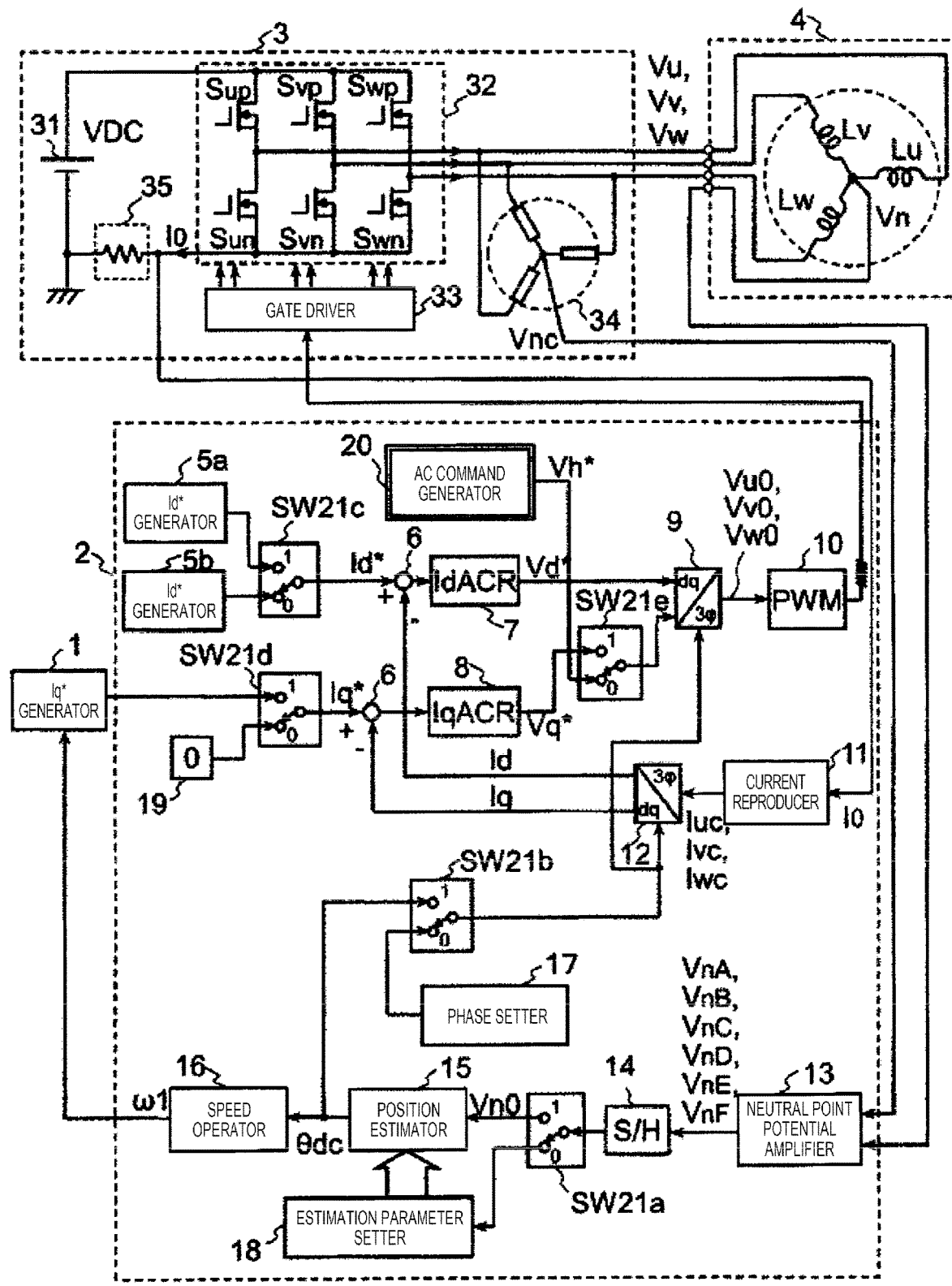

[Fig. 2(a)]
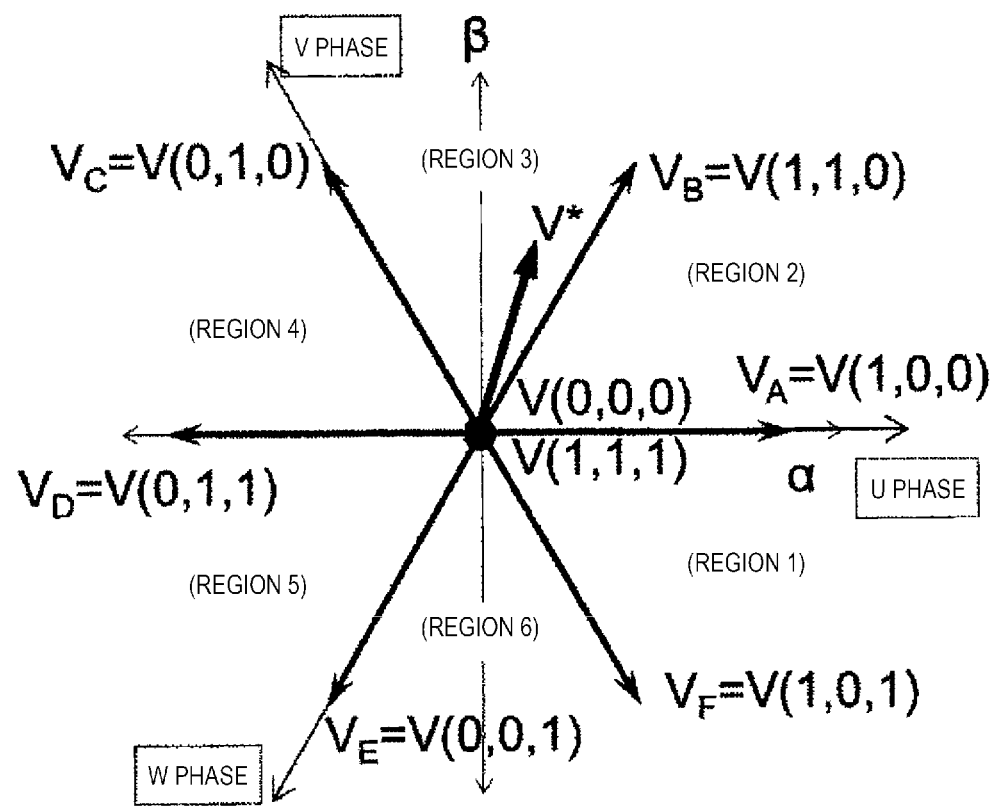

[Fig. 2(b)]
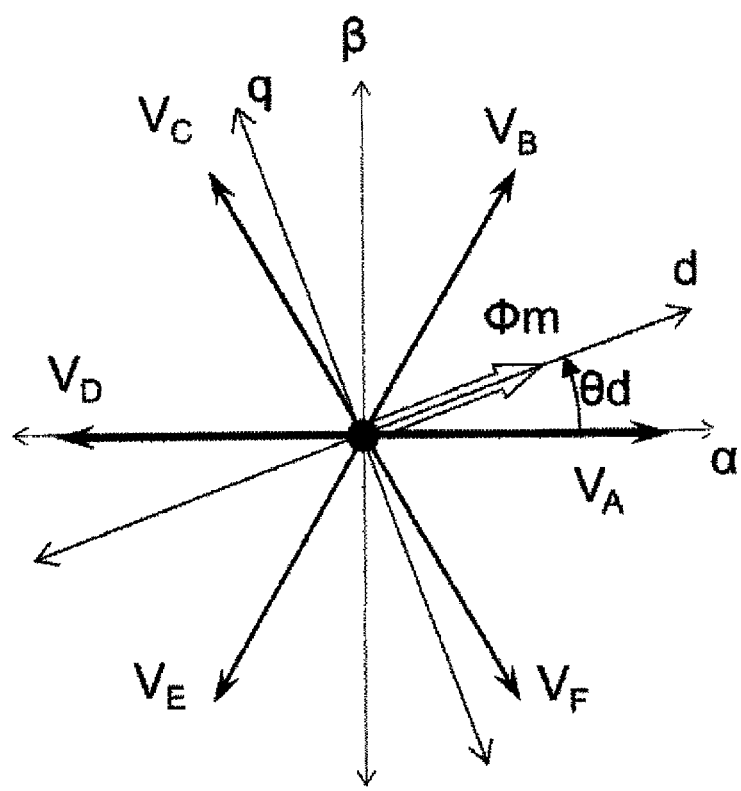

[Fig. 3(a)]
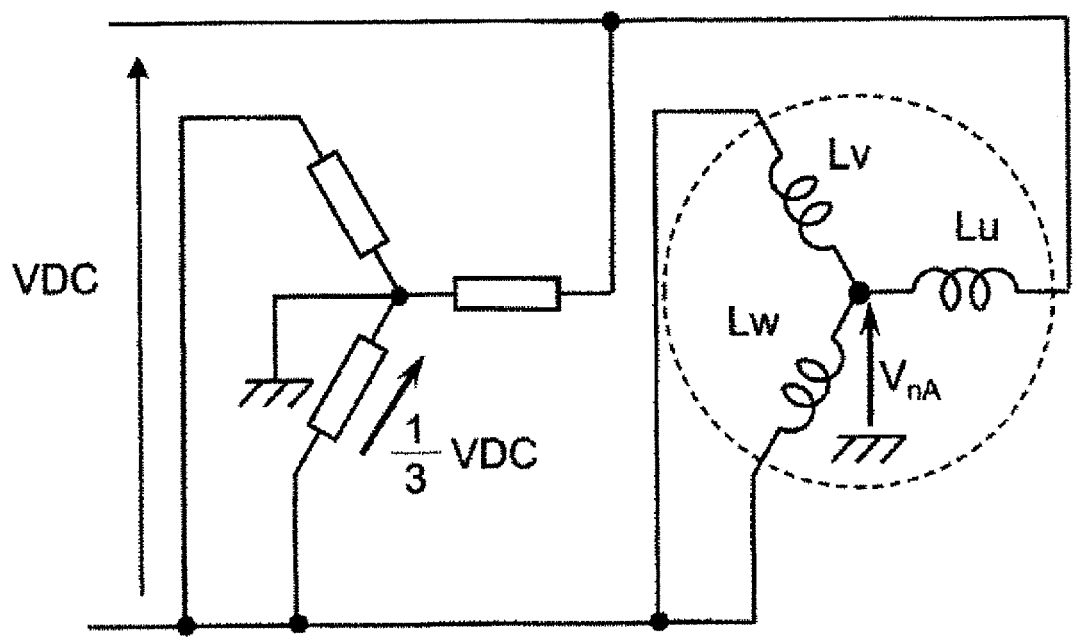
$$V_{nA} = \left\{ \frac{Lv//Lw}{Lv//Lw + Lu} - (1/3) \right\} \times VDC$$

[Fig. 3(b)]
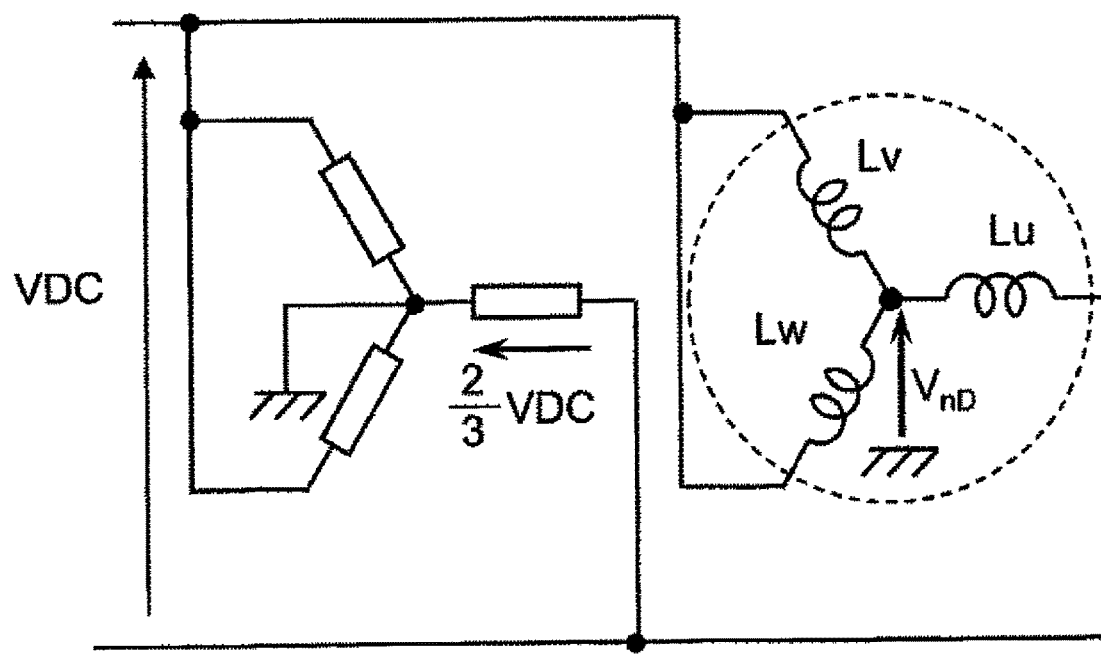
$$V_{nD} = \left\{ \frac{Lu}{Lv//Lw + Lu} - (2/3) \right\} \times VDC$$

[Fig. 4]
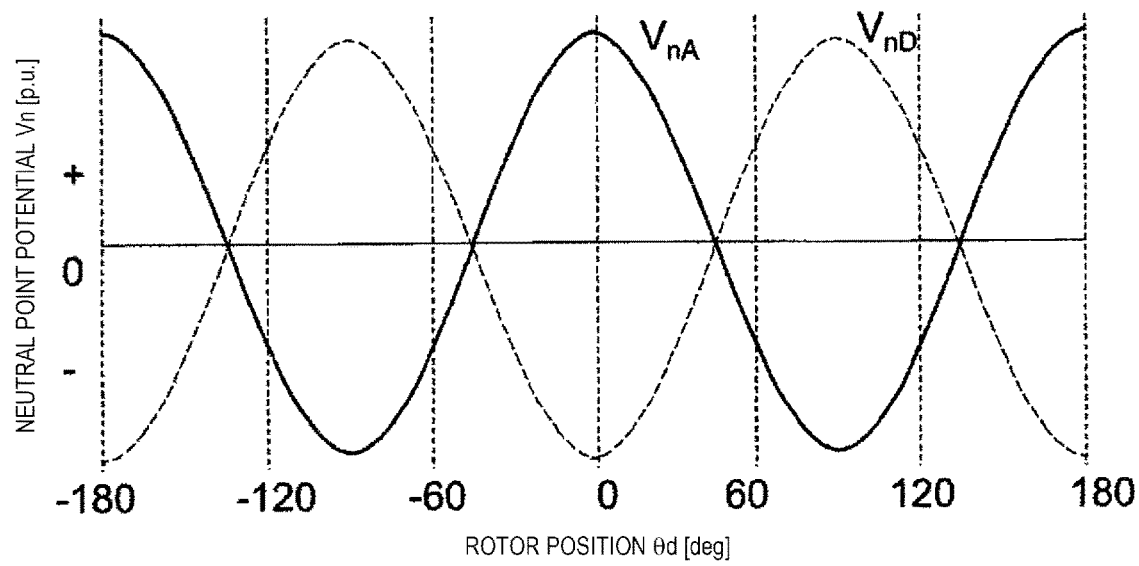

[Fig. 5]
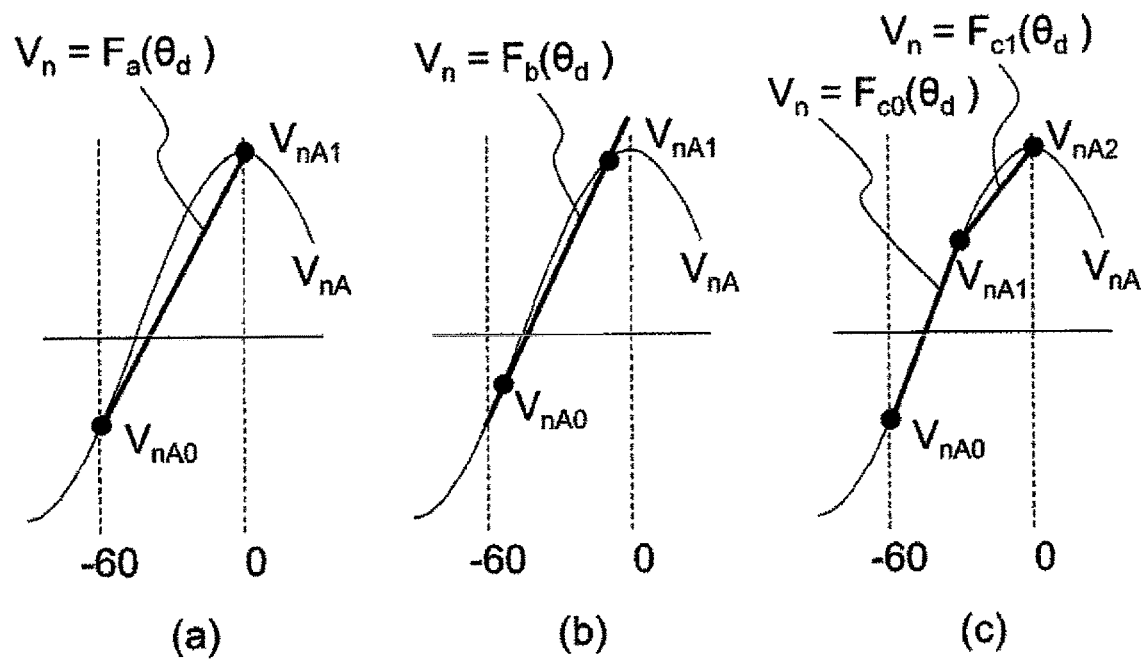

[Fig. 6]
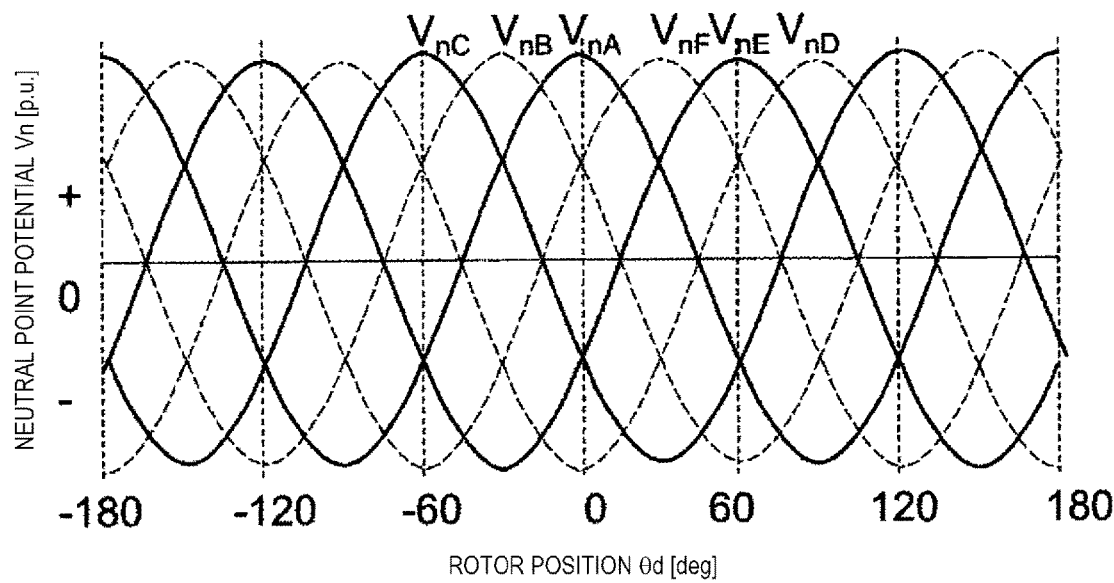

[Fig. 7]
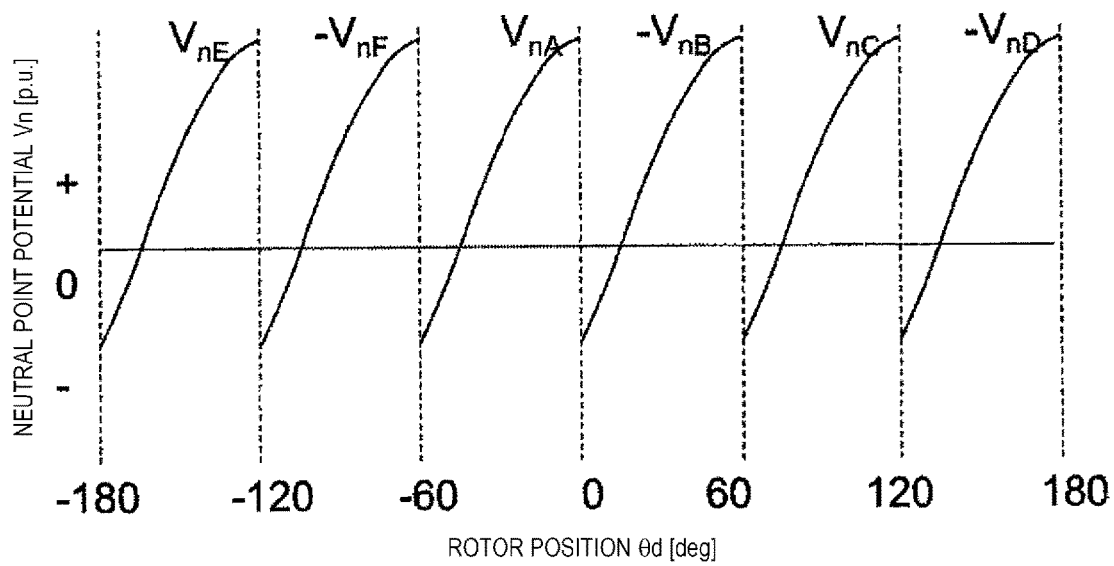

[Fig. 8]
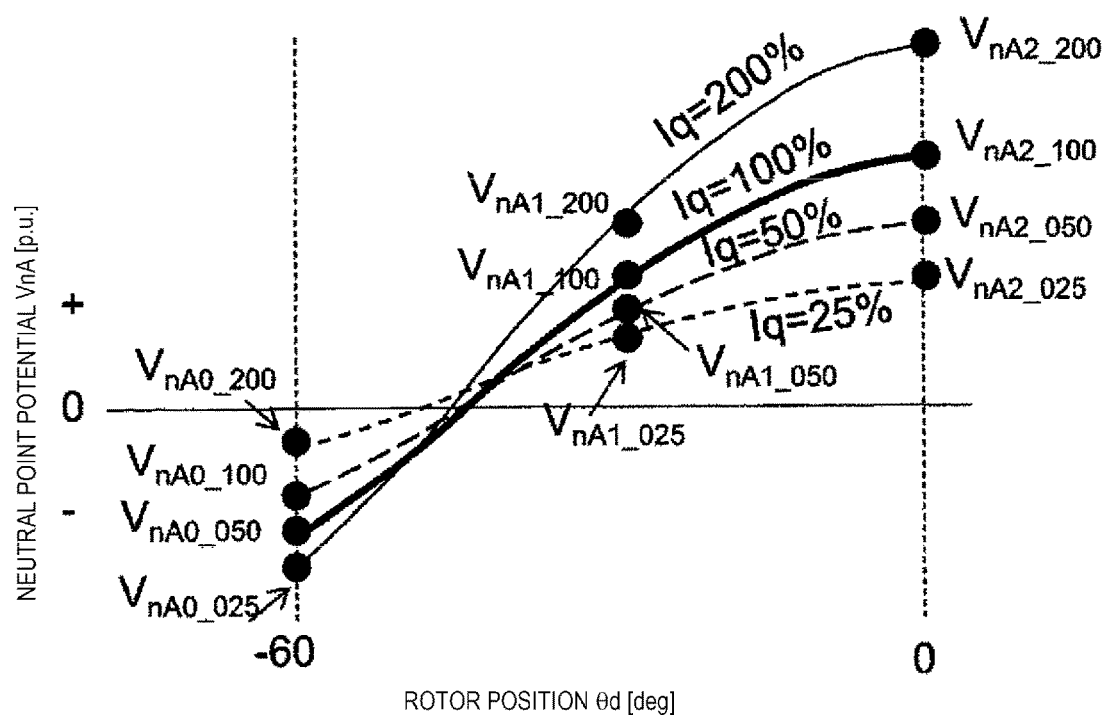

[Fig. 9(a)]
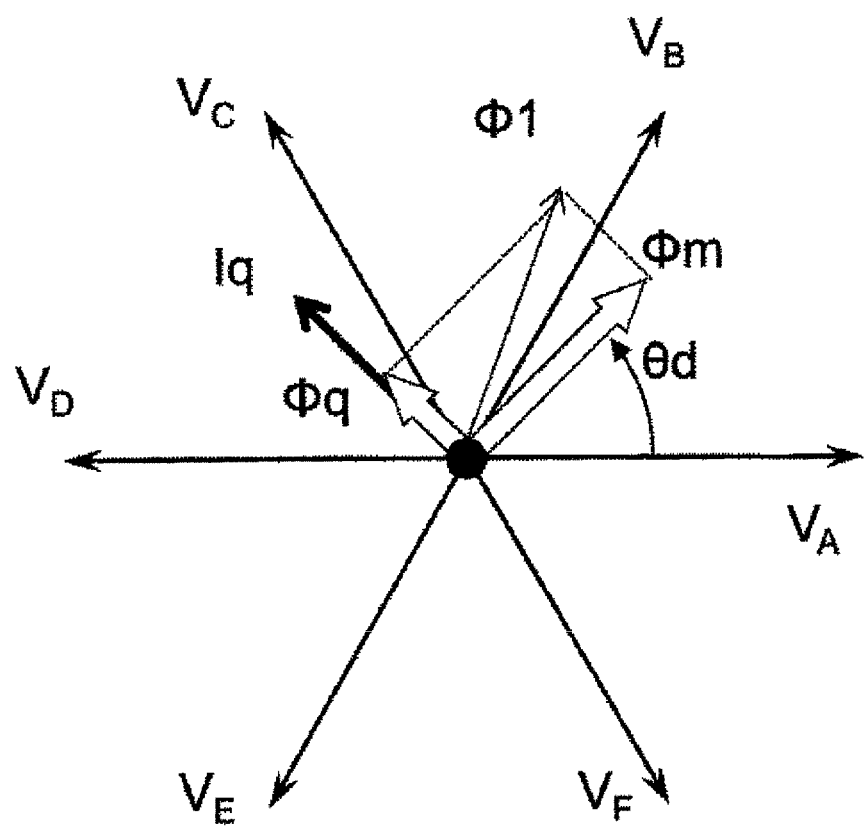

[Fig. 9(b)]
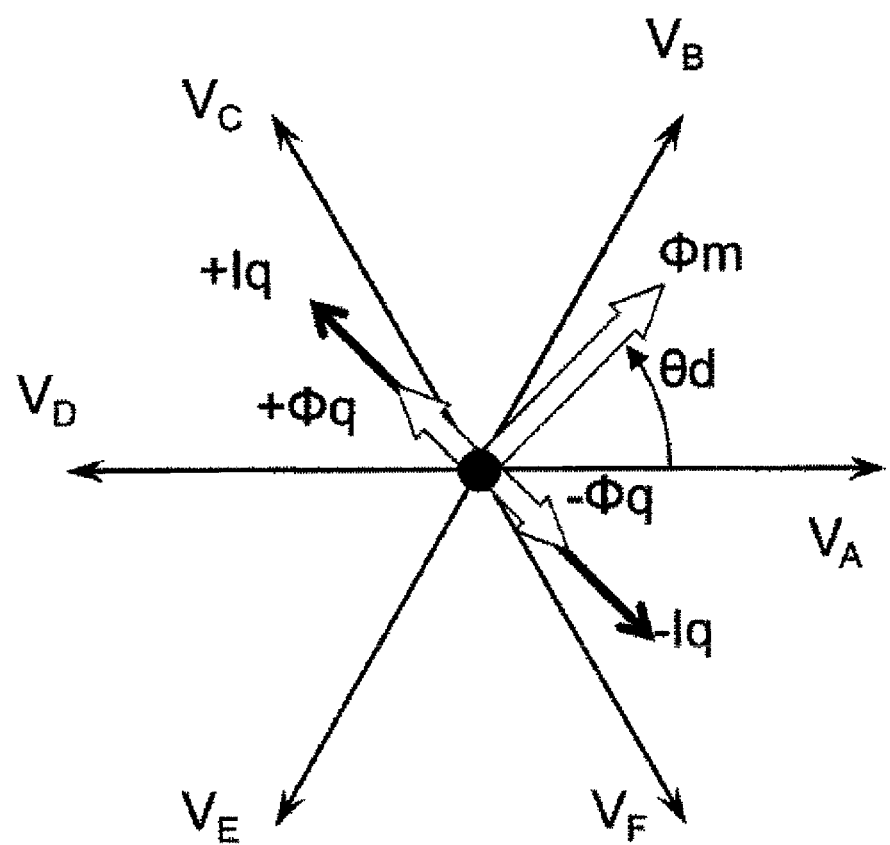

[Fig. 10]
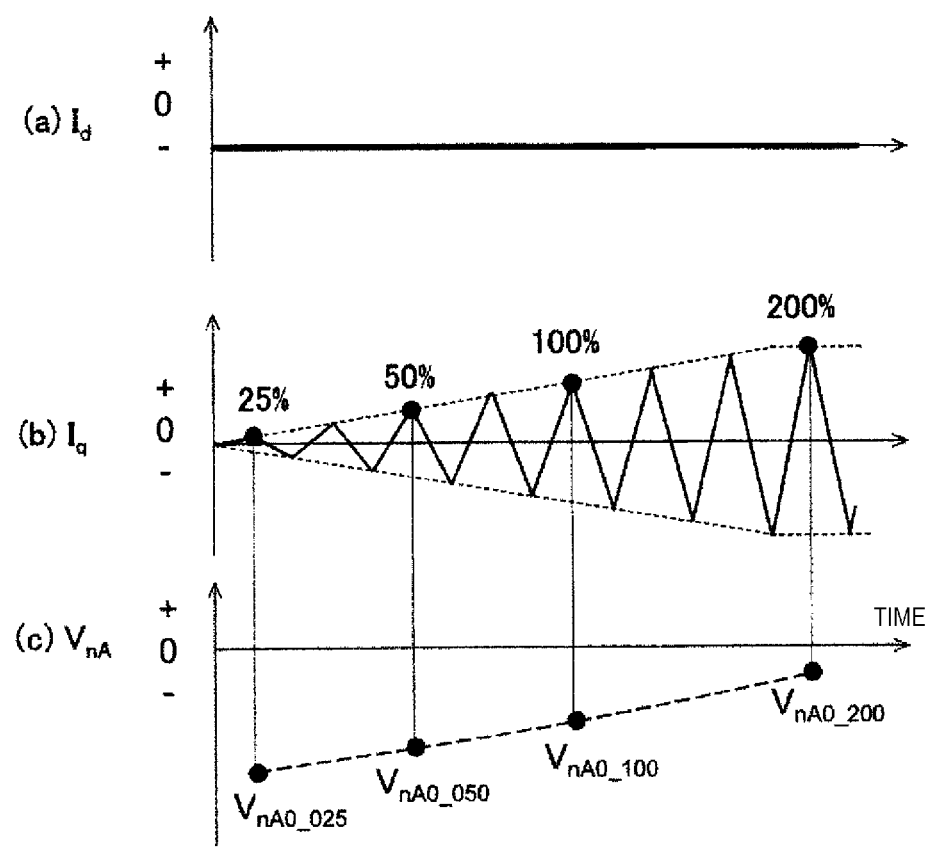

[Fig. 11]
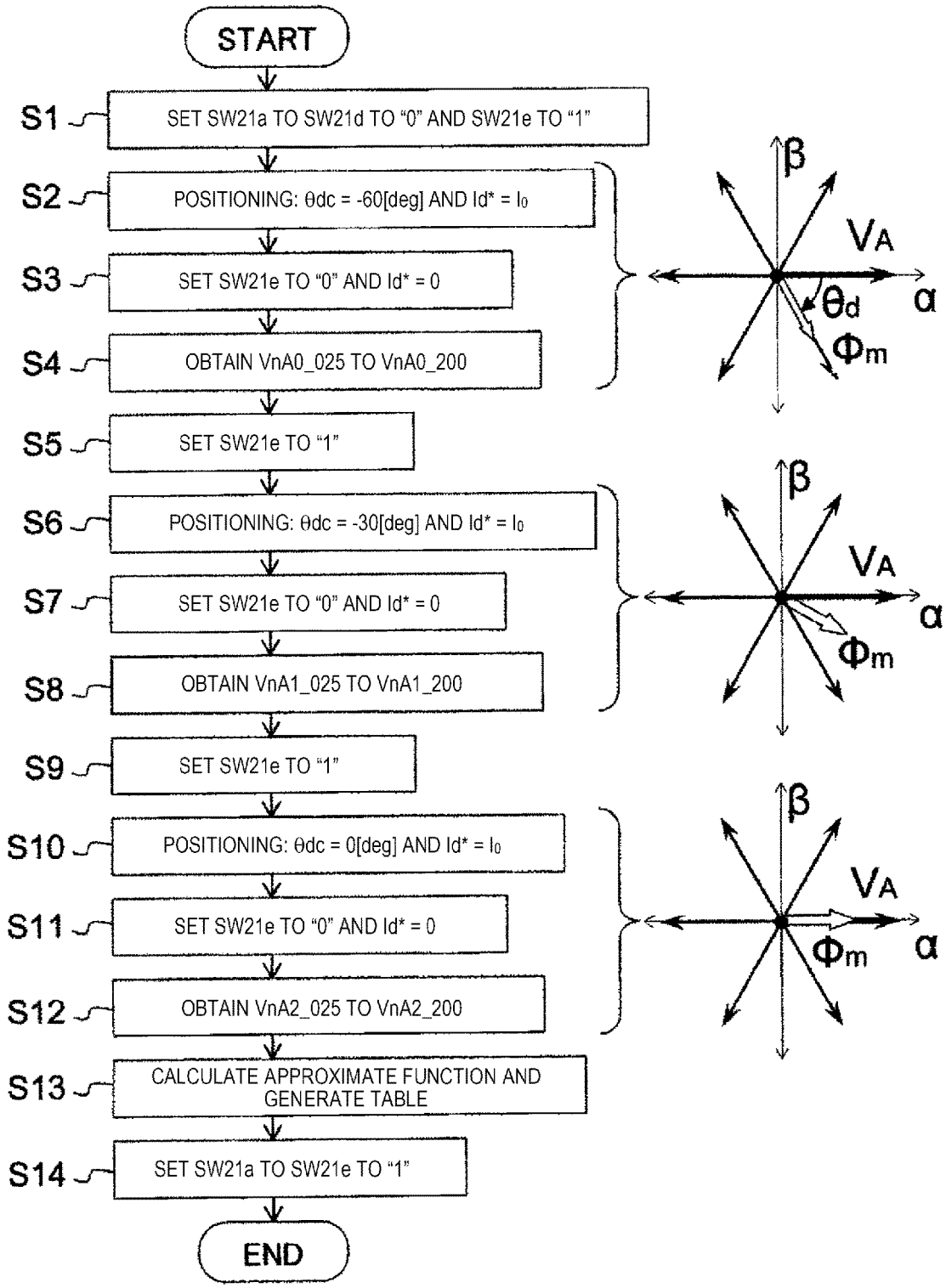

[Fig. 12(a)]
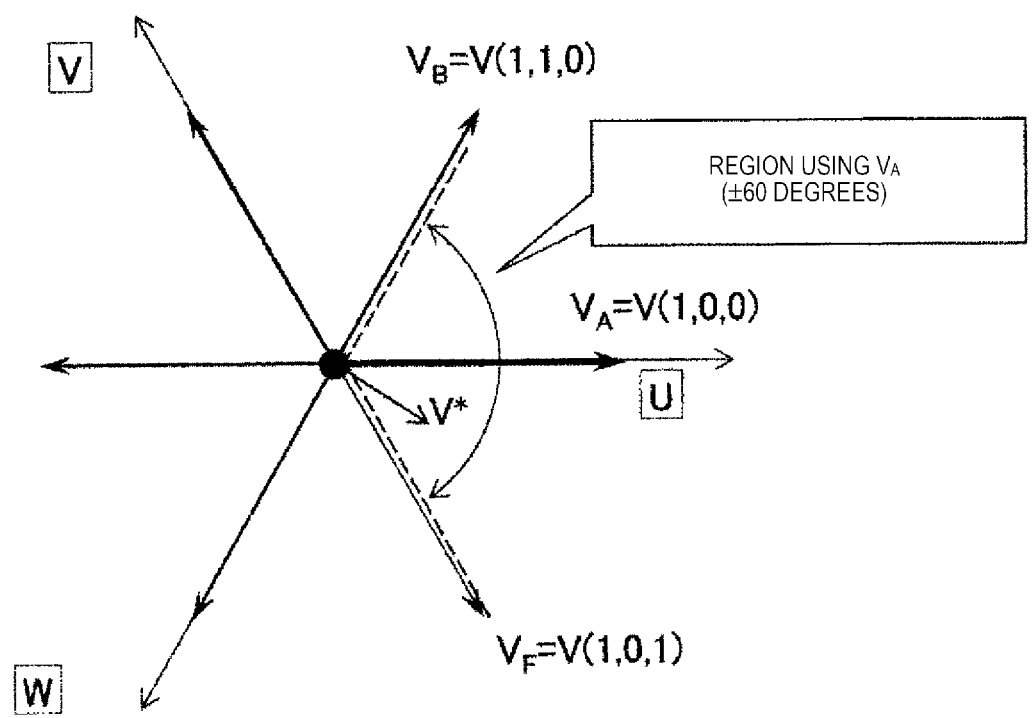

[Fig. 12(b)]
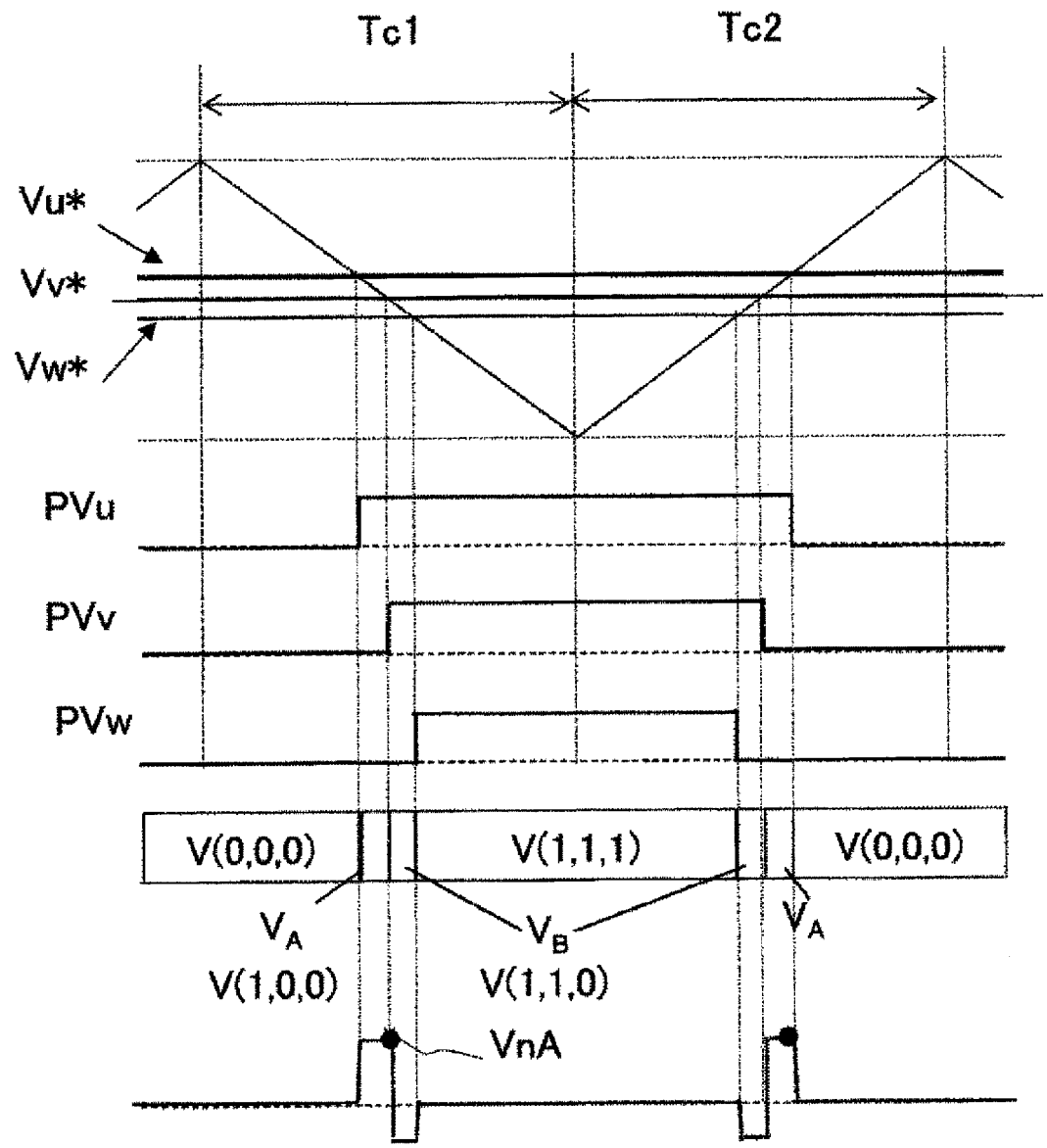

[Fig. 12(c)]
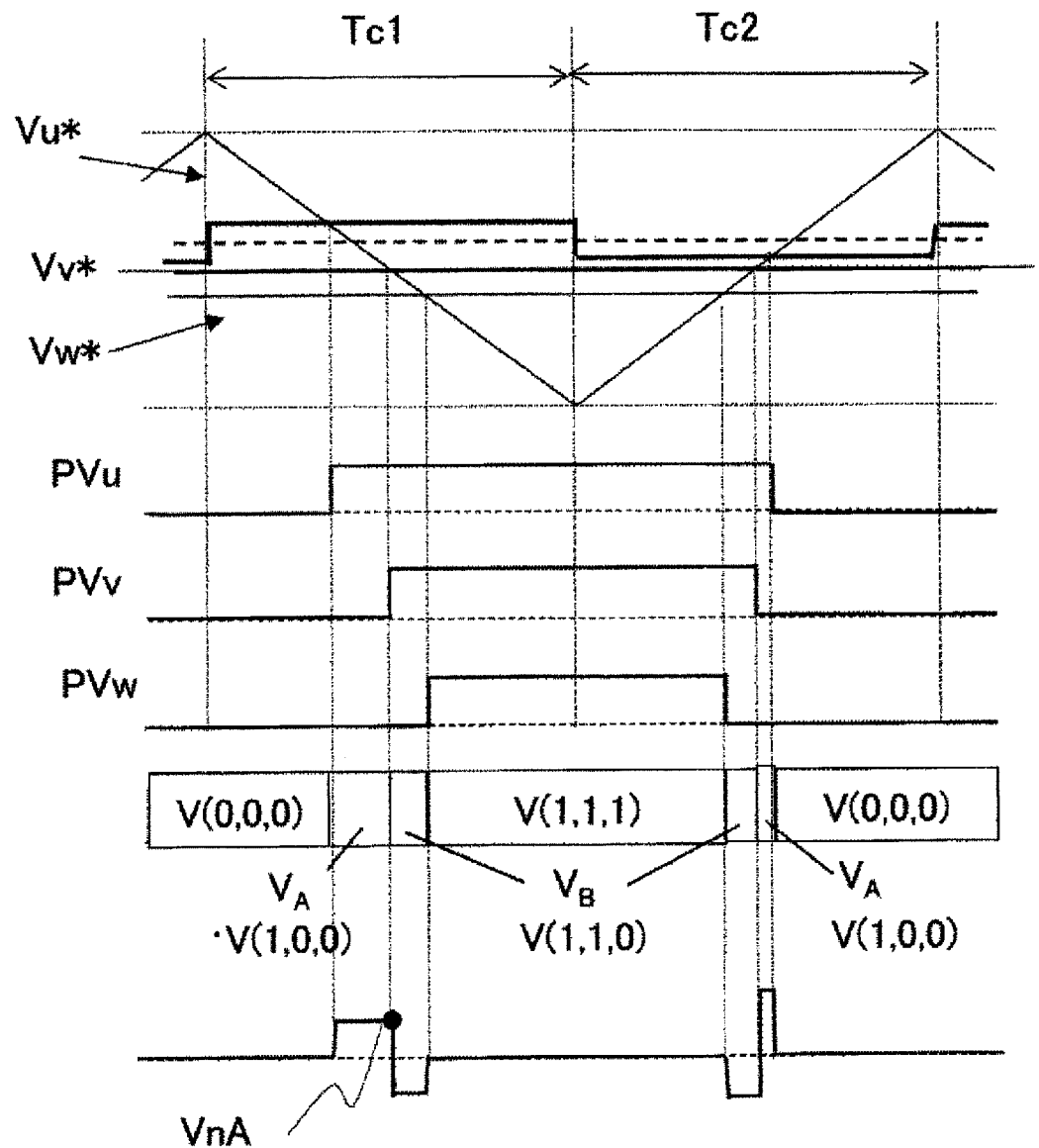

[Fig. 13]
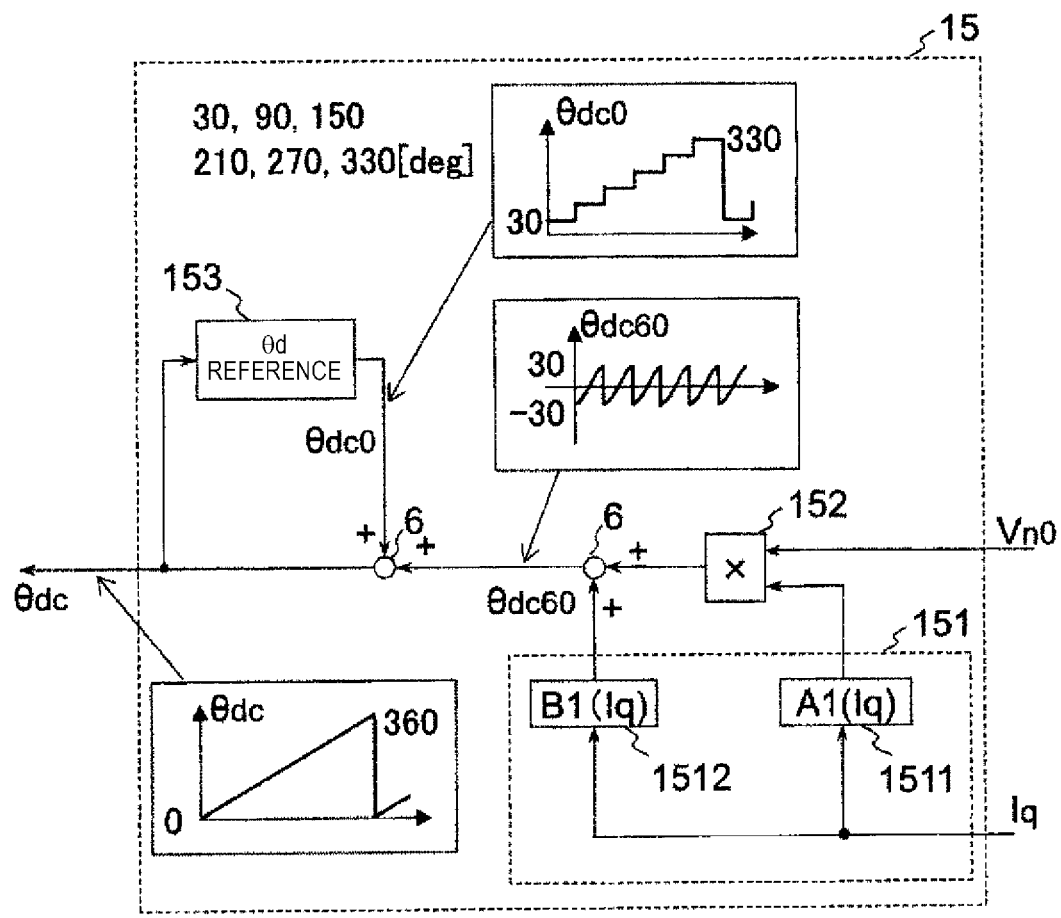

[Fig. 14]
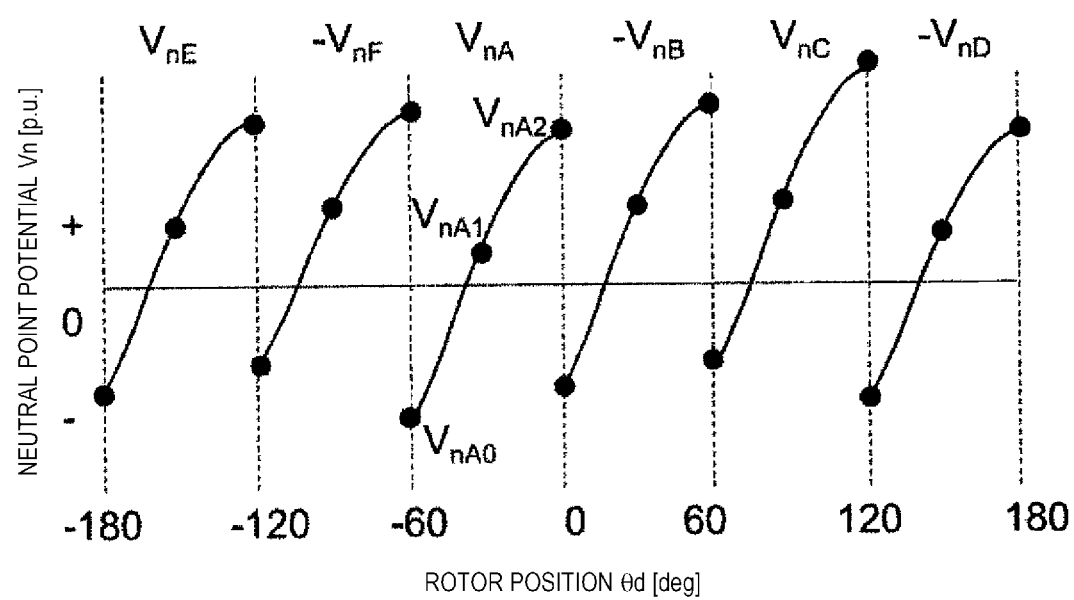

[Fig. 15]
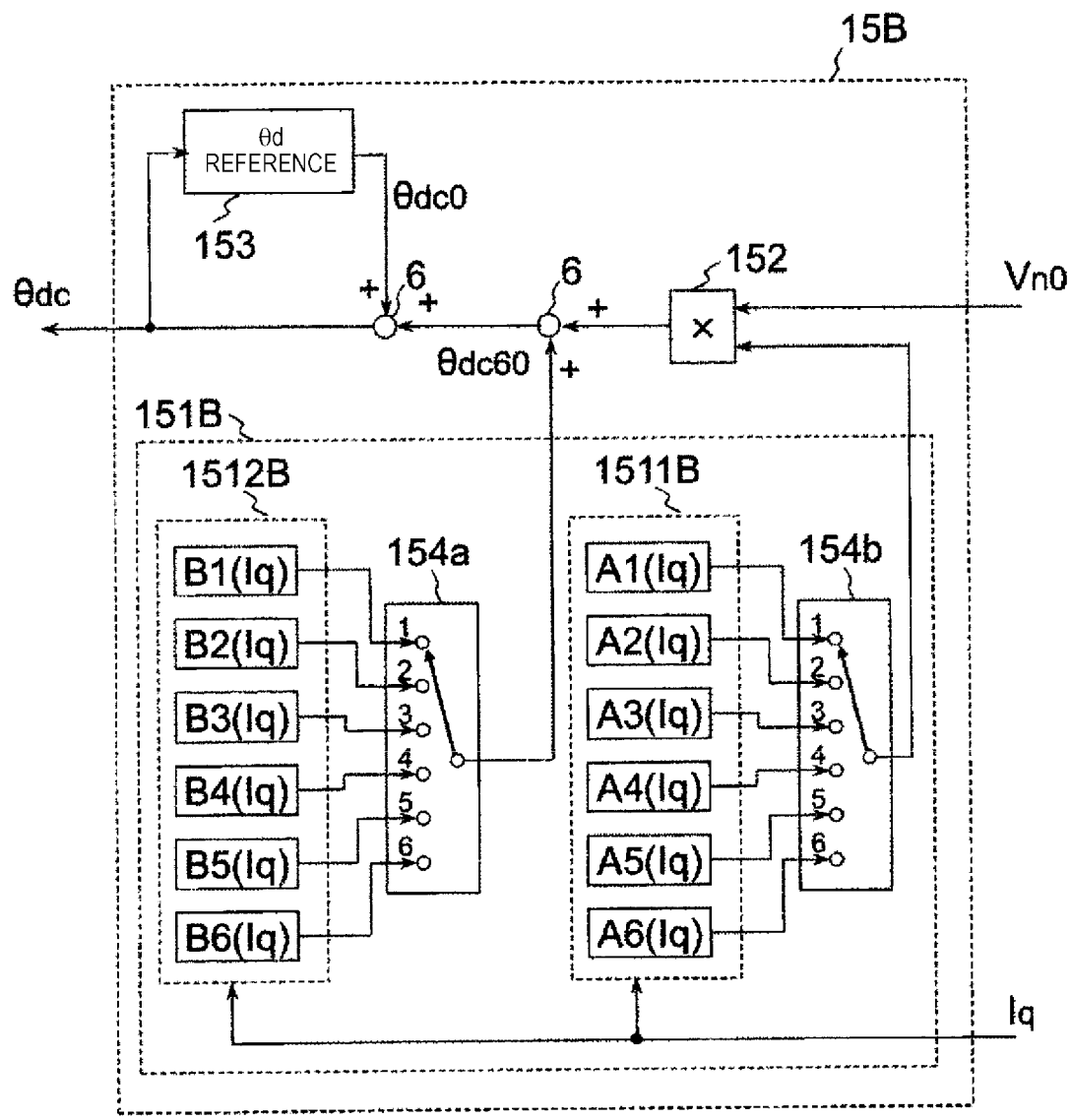

[Fig. 16]
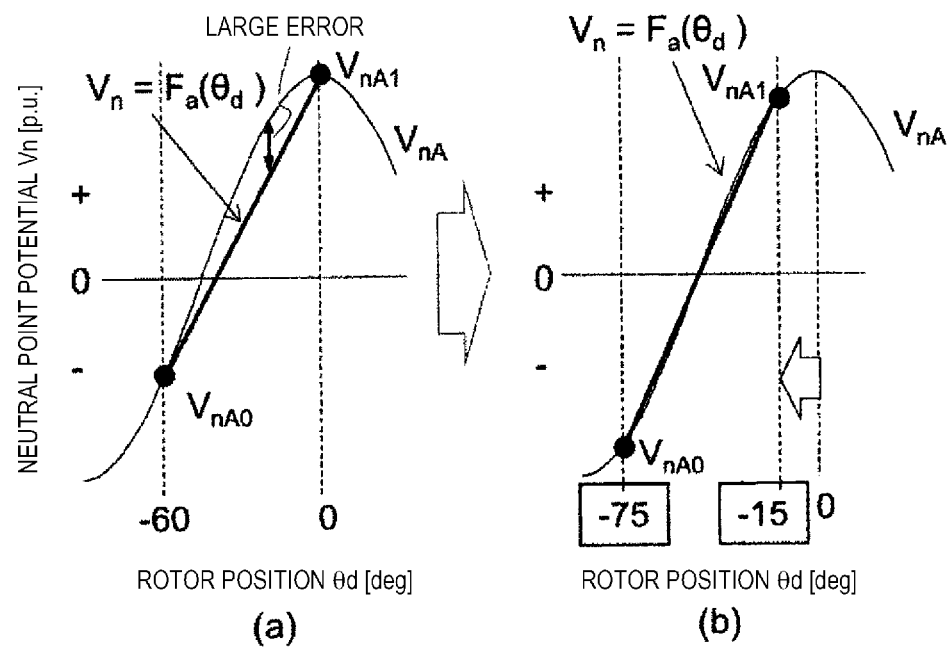

[Fig. 17]
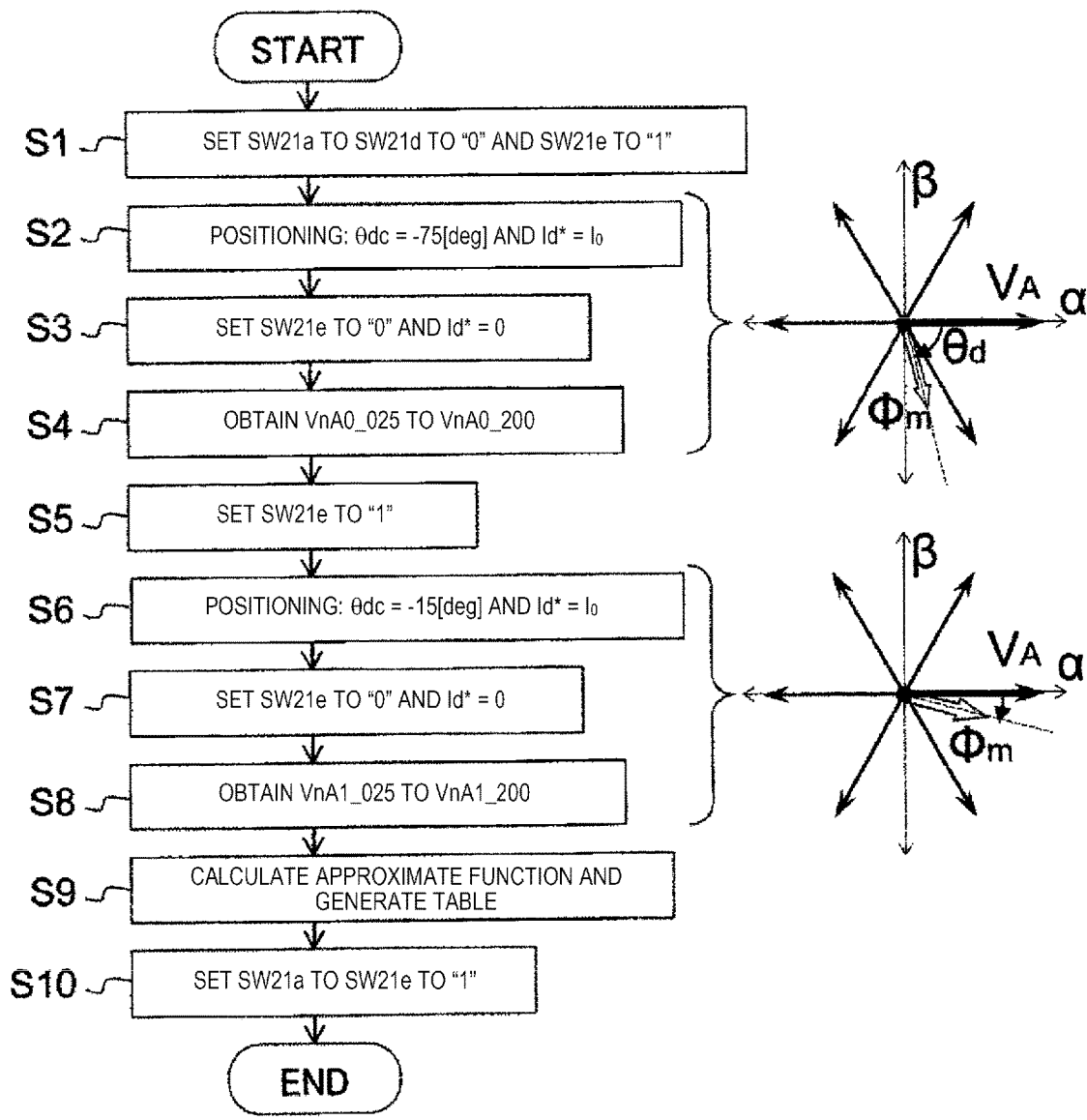

[Fig. 18]
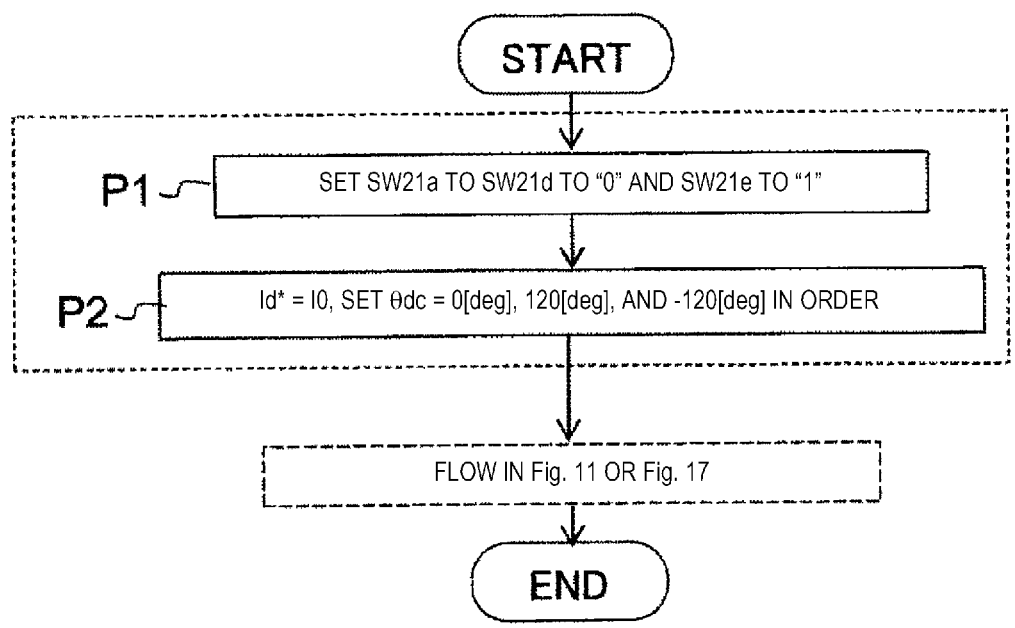

[Fig. 19]
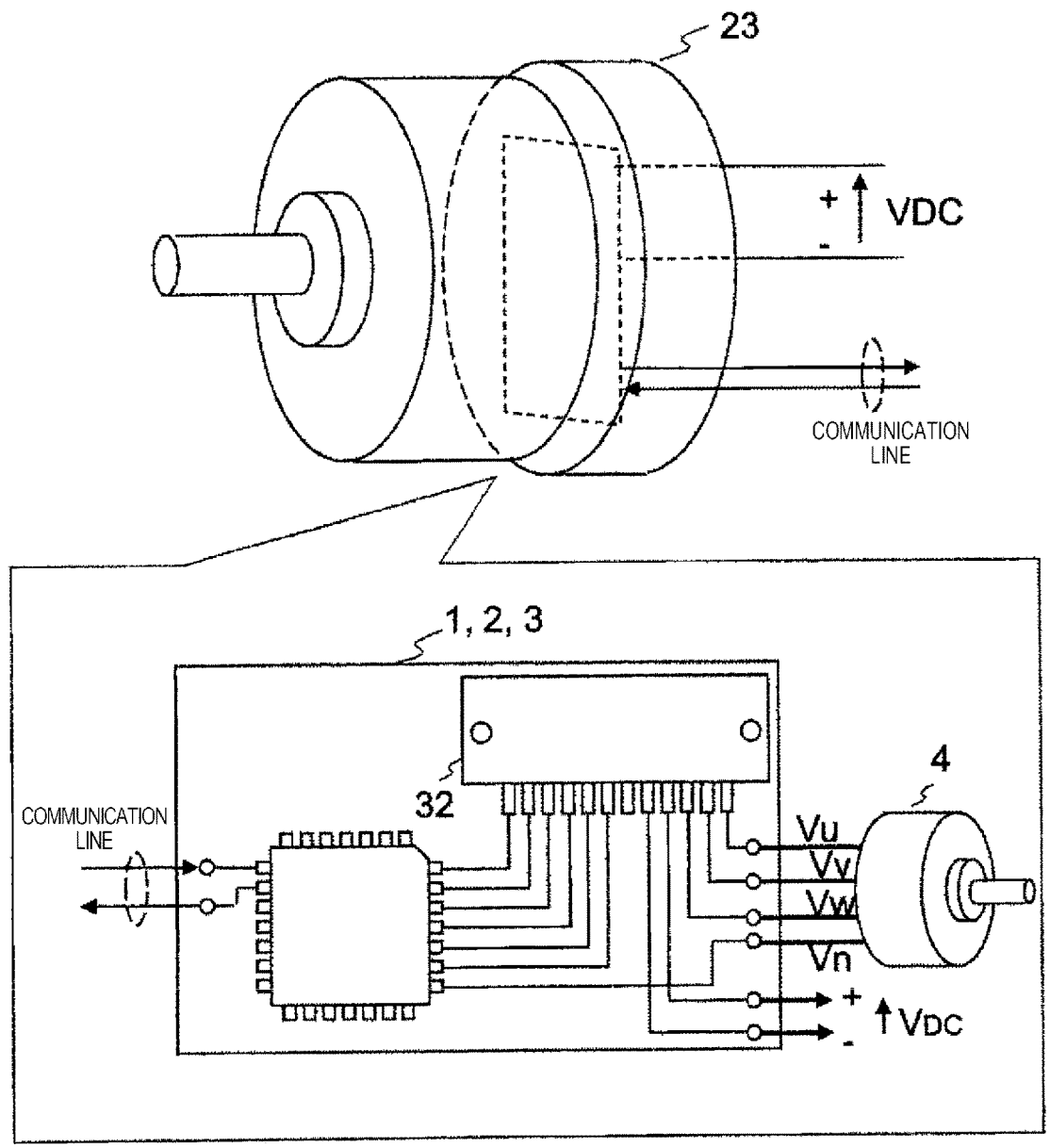

[Fig. 20]
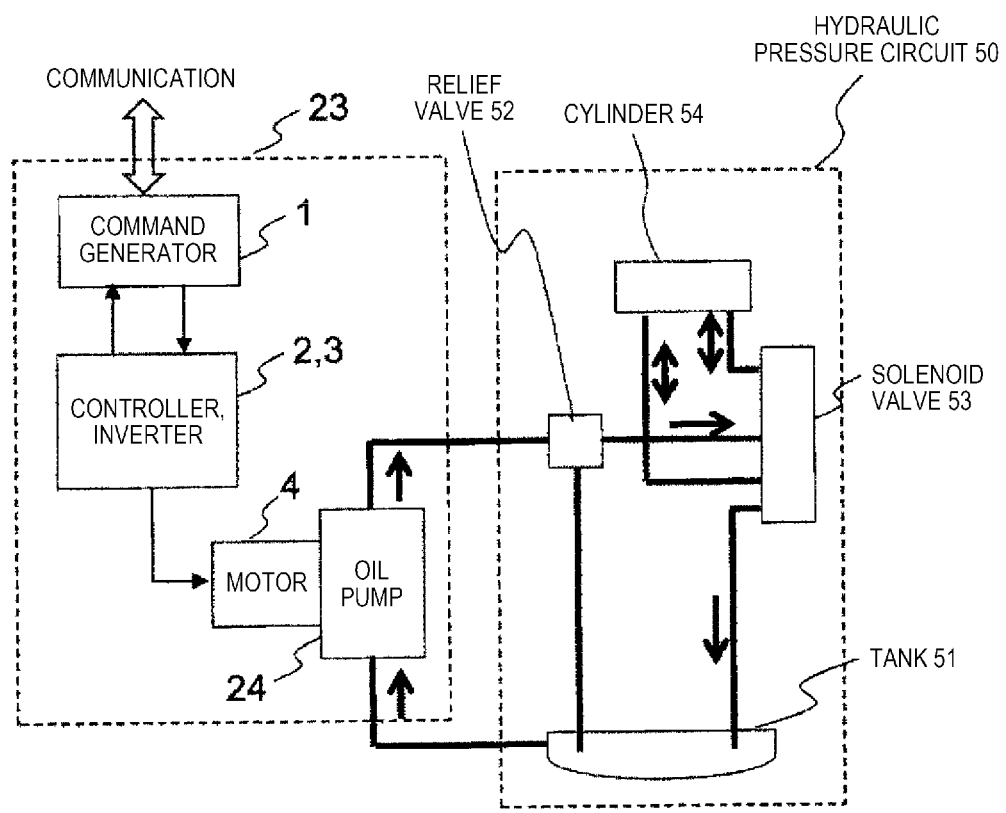

[Fig. 21]
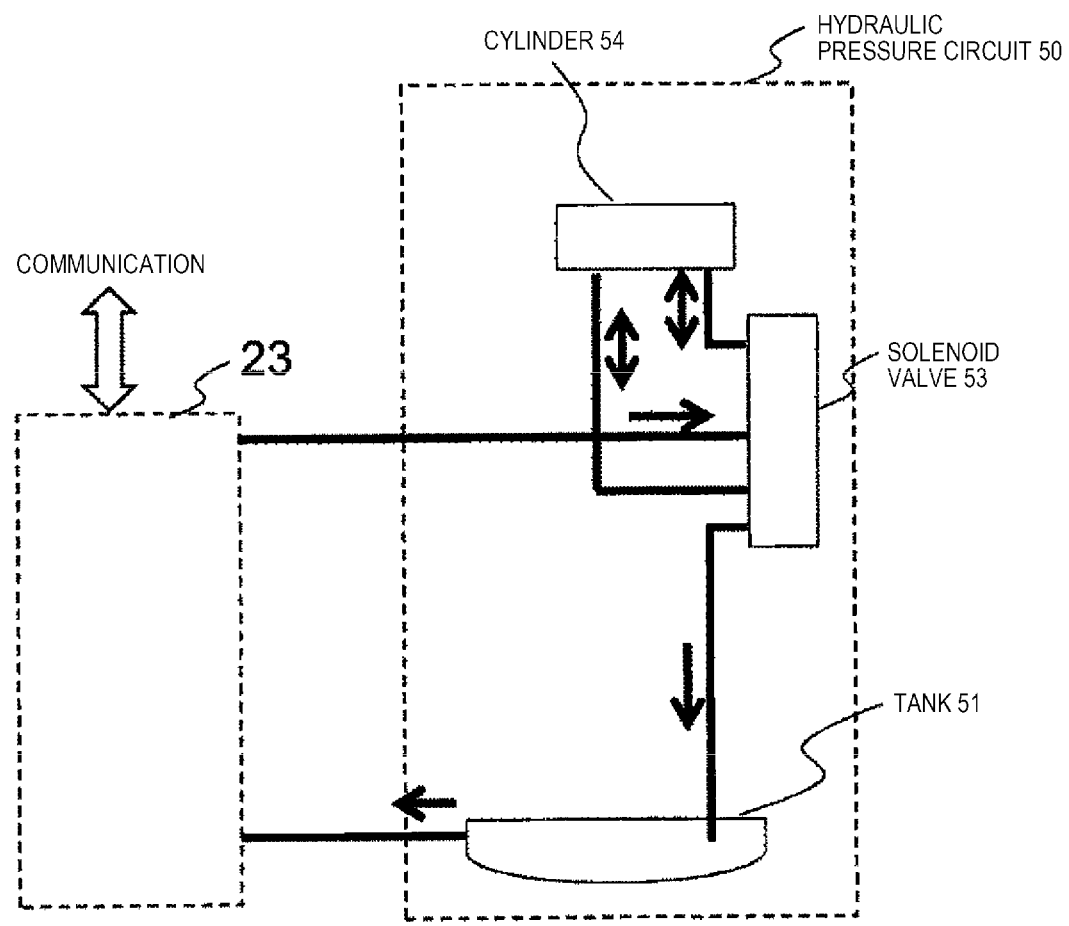

[Fig. 22]
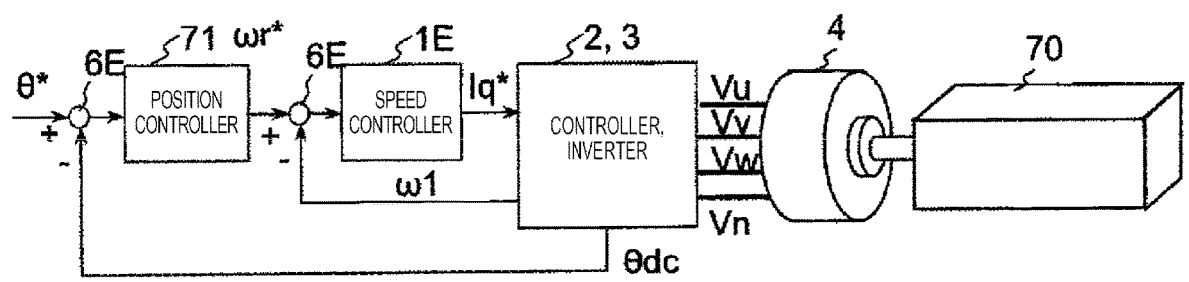

CONTROL DEVICE OF SYNCHRONOUS ELECTRIC MOTOR, INTEGRATED MOTOR SYSTEM, PUMP SYSTEM, AND POSITIONING SYSTEM

TECHNICAL FIELD

The present invention relates to an electric motor driving technology applied to applications requiring, for example, rotational speed control of a pump, a fan, a compressor, and a spindle motor, positioning control of a conveyor, an elevator, and a mechanical device, and torque control such as electric assist, and the like.

BACKGROUND ART

For example, in fields such as home appliances, industries, and automobiles, a motor driving device for rotational speed control of a fan, a pump, and a compressor, torque control of electric power steering, and positioning control of a transport machine, an elevator, and the like are used. In the motor driving device, a permanent magnet type synchronous electric motor (hereinafter, referred to as "PM motor"), which is a small-sized and highly efficient alternating current (AC) electric motor, is widely used. However, information on a magnetic pole position of a rotor of the PM motor for controlling driving of the PM motor is required, so that a position sensor such as a resolver or a hall IC is indispensable. Recently, without using the position sensor, sensorless control for controlling rotation speed and torque control of the PM motor is spread.

By realizing the sensorless control, it is possible to reduce a cost of the position sensor (cost of the sensor itself, cost of wiring of the sensor, and cost of attaching and adjusting the sensor) and as the sensor becomes unnecessary, the device can be miniaturized and can be used in a bad environment.

Currently, the sensorless control of the PM motor adopts a method of directly detecting the induced voltage (speed electromotive voltage) generated by rotation of the rotor and driving the PM motor by position information of the rotor or a position estimation technology of estimation-operating the rotor position from a mathematical model of the PM motor.

The method is based on a method using the speed electromotive voltage in principle, so that it is difficult to be applied to a region where the speed electromotive voltage becomes small, such as a stop range, a low speed region, or the like. Therefore, these technologies are mainly applied to the speed range above a medium to high speed range and open loop control such as V/F constant control is used in the low speed region. In a case of the open loop control, since the torque generated by the motor cannot be freely controlled, controllability in the low speed region is poor and efficiency also deteriorates.

Regarding to the problem, a method of obtaining the rotor position information from the low speed region is proposed.

In PTL 1, a pulse voltage is applied to two phases of the PM motor among three phases to detect the open voltage of the remaining one phase not energized, so that position information is obtained from the voltage. Since the electromotive voltage of the open phase is generated according to the rotor position of the PM motor, the electromotive voltage can be used for estimation of the rotor position. The electromotive voltage is a voltage generated by slight inductance change in the motor by a relationship between a permanent magnet-magnetic flux attached to the rotor of the PM motor and a current energized by the pulse voltage, so that the electromotive voltage can be observed in a stop state. This voltage is called "magnetic saturation electromotive voltage".

In addition, in this method, since the electromotive voltage of the not-energized phase (open phase) is observed, among the three phases, a 120-degree energization driving for selecting and energizing the two phases is indispensable. For position-sensorless driving, it is required that these energized phases are switched according to the position of the rotor. For switching these energized phases, "magnetic saturation electromotive voltage" generated in the open phase is used.

The magnetic saturation electromotive voltage is changed to be monotonously increased or decreased according to the position of the rotor. In PTL 1, "threshold value" is provided in the open phase electromotive voltage. When the magnetic saturation electromotive voltage reaches the threshold value, position-sensorless control is performed by switching to the next energization phase. At that time, "threshold value" is a very important setting factor. The threshold value has subtle variations for each of phases or phase windings of the motor and it is necessary to set threshold value appropriately. A method of automatically executing adjustment work for each of motors is described in PTL 2.

In PTL 2, with respect to the method described in PTL 1, by executing an automatic threshold value adjustment routine in advance, it becomes unnecessary to manually adjust the threshold value by an operator and start-up work of a system is saved.

Although the 120-degree energization driving is premised in these related arts, a sinusoidal wave driving method is already reported. In PTLs 3 and 4, by observing a connection point potential (referred to as neutral point potential) of a Y-connected three-phase windings using the three-phase stator windings Y-connected as the PM motor, the rotor position is estimated.

Since it is unnecessary to observe the open phase in the same manner as in PTL 1, it is possible to energize three phases at the same time and to drive the PM motor with an ideal sinusoidal current. However, detection of the neutral point potential is indispensable.

In PTL 3, a method of inserting a voltage pulse for observing the neutral point potential is described. In addition, in PTL 4, it is possible to immediately estimation-operate the rotor position by using a voltage applied to the inverter for driving the PM motor and observing the neutral point potential by interlocking with a PWM pulse when a pulse width is modulated.

CITATION LIST

Patent Literature

PTL 1: JP-A-2009-189176
PTL 2: JP-A-2012-10477
PTL 3: JP-A-2010-74898
PTL 4: Pamphlet of International Publication No. WO 13/153657

SUMMARY OF INVENTION

Technical Problem

In the technology of PTL 1, it is possible to generate torque without step out in a state in which the motor is stopped or in a low speed. In addition, PTL 2 describes automatic adjustment of "threshold value" which is an important setting number for realizing sensorless driving in PTL 1. However, since the 120-degree energization driving is the basis in both of the methods of PTLs 1 and 2, a current harmonic wave when PM motor is driven is extremely large. As a result, there is a case where a harmonic loss may be increased and vibration/noise due to torque pulsation may be problematic. Driving with the sinusoidal current is desirable for driving the PM motor.

In PTLs 3 and 4, it is possible that the neutral point potential of the stator winding of the PM motor is observed to drive the PM motor from a zero speed by the sinusoidal current. In addition, there is no structural restriction (for example, limitation such as being limited to embedded magnet type) of the PM motor and versatility is also high. However, these PTLs 3 and 4 have the following problems which are not solved.

Although PTL 3 describes a method of switching energization phases of the three phases by using the observed neutral point potential, PTL 3 does not describe a case where the neutral point potential for switching is specifically set, a case where specifications of motors are different from one another, or a case of unbalance of the three phases. Further, there is a case where the neutral point potential changes due to a torque current by magnetic circuit characteristics of the motor, but PTL 3 does not describe countermeasures for the change. For this reason, in order to realize the method of PTL 3, there is a problem in practical use such as an adjustment work for each of the motors and an increase in a position estimation error with respect to a load torque.

In PTL 4, the neutral point potential in each of voltage patterns is observed when two types of voltage patterns are applied and the rotor position of the PM motor can be estimation-operated by this signal process. However, in a case where it is impossible to deal with three-phase unbalance, for example, only inductance of a specific phase is different from the others, a large pulsation component is generated at the estimated rotor position. In addition, although the two types of the voltage patterns can be created by pulse width modulation using ordinary triangular wave carrier, it is necessary to abundantly prepare an AD converter, a timer, or the like as a function of a controller so as to detect the neutral point potential corresponding to each of the voltage patterns. In a case of using an inexpensive microcomputer, these functions are insufficient and the technology of PTL 4 cannot be applied as it is. In addition, in the same manner as in PTL 3, in a case where the neutral point potential is changed due to the torque current, there is a possibility that a position estimation error increases and torque performance deteriorates.

Solution to Problem

According to the present embodiment, a control device of a synchronous electric motor includes: the synchronous electric motor with three-phase stator windings Y-connected; a detection unit that detects a neutral point potential which is a potential at a Y connection point; and an inverter that drives the synchronous electric motor. The control device of the synchronous electric motor which controls the synchronous electric motor using the inverter includes a measurement mode in which the neutral point potential is detected in a state in which the synchronous electric motor is energized by an AC current. It is preferable that the control device of the synchronous electric motor controls the synchronous electric motor based on a value of the neutral point potential detected in the measurement mode.

Advantageous Effects of Invention

Since the invention is configured as described above, the following effects are obtained. According to the invention, since a relationship between the neutral point potential of the PM motor and the rotor position and a relationship between the torque current and the neutral point potential can be obtained in advance, sensorless driving of a motor with any magnetic circuit characteristics in a low speed region can be realized by a simple adjustment algorithm.

BRIEF DESCRIPTION OF DRAWINGS

FIG. 1 is a diagram illustrating a configuration of a control device of a synchronous electric motor.

FIG. 2(a) is a diagram illustrating a vector display of an output voltage of an inverter on $\alpha\beta$ coordinates.

FIG. 2(b) is a diagram illustrating a relationship with rotor positions $\theta d$ of a PM motor.

FIG. 3(a) is a diagram illustrating a generation principle of a neutral point potential of the PM motor according to a first embodiment.

FIG. 3(b) is a diagram illustrating a generation principle of a neutral point potential of the PM motor according to the first embodiment.

FIG. 4 is a waveform diagram illustrating a measurement example of the neutral point potential according to the first embodiment.

FIG. 5 is a waveform diagram illustrating linearization of the neutral point potential according to the first embodiment.

FIG. 6 is a waveform diagram illustrating all types of changes of the neutral point potential according to the first embodiment.

FIG. 7 is a waveform diagram illustrating a change of the neutral point potential used for sensorless driving according to the first embodiment.

FIG. 8 is a waveform diagram illustrating a change by current dependence of the neutral point potential used for the sensorless driving according to the first embodiment.

FIG. 9(a) is a diagram illustrating a relationship between a magnetic flux and a torque current of an inside of the PM motor during normal driving.

FIG. 9(b) is a diagram illustrating a relationship between a magnetic flux and a torque current of the inside of the PM motor according to the first embodiment.

FIG. 10 is a diagram illustrating a waveform when current dependence is obtained in a measurement mode according to the first embodiment.

FIG. 11 is a flowchart illustrating an algorithm during the measurement mode according to the first embodiment.

FIG. 12(a) is a diagram illustrating a position of a voltage command V* which can output a voltage vector VA.

FIG. 12(b) is a diagram illustrating a voltage pulse and a neutral point potential of each of phases during a non-pulse shift.

FIG. 12(c) is a diagram illustrating a voltage pulse and a neutral point potential of each of phases during a pulse shift.

FIG. 13 is a block configuration diagram of a position estimator according to the first embodiment.

FIG. 14 is a waveform diagram illustrating an appearance of a variation of a neutral point potential used for sensorless driving according to a second embodiment.

FIG. 15 is a diagram illustrating switching of a coefficient table according to the second embodiment.

FIG. 16 is a waveform diagram illustrating linearization of a neutral point potential according to a third embodiment.

FIG. 17 is a flowchart illustrating an algorithm during a measurement mode according to the third embodiment.

FIG. 18 is a flowchart illustrating an algorithm during a measurement mode according to a fourth embodiment.

FIG. 19 is a diagram illustrating a configuration of an integral motor driving system according to a fifth embodiment.

FIG. 20 is a diagram illustrating a configuration of a hydraulic pump system according to a sixth embodiment.

FIG. 21 is a diagram illustrating a configuration of the hydraulic pump system in which a relief valve is removed according to the sixth embodiment.

FIG. 22 is a block diagram illustrating a configuration of a positioning control system according to a seventh embodiment.

DESCRIPTION OF EMBODIMENTS

Hereinafter, embodiments of the invention will be described with reference to drawings. In the embodiment of the invention, in view of a problem in that a neutral point potential fluctuates also due to a torque current, there is provided a control device of a synchronous electric motor which automatically adjusts a magnetic saturation characteristic of each of motors to be controlled, dependence of the torque current, a three-phase imbalance characteristic, and the like and realizes high torque sinusoidal wave driving without using a rotor position sensor in a vicinity of zero speed. As a result, it is possible to drive high torque with less vibrations and noises than the previously disclosed method. In addition, in actual driving after adjustment, position estimation-operation by a simple algorithm becomes possible, so that the position estimation-operation can be realized by an inexpensive microcomputer.

First Embodiment

A control device of an alternating current (AC) electric motor according to the first embodiment of the invention will be described using FIGS. 1 to 13.

The device is for driving a three-phase permanent magnet synchronous electric motor 4 (hereinafter, referred to as PM motor 4) and is broadly configured to include an Iq* generator 1, a controller 2, an inverter 3, and the PM motor 4 which is a driving target. The inverter 3 includes a direct current (DC) power supply 31, an inverter main circuit 32, agate driver 33, a virtual neutral point potential generator 34, and a current detector 35.

Although the present embodiment uses the PM motor as an example of the driving target, as long as an electric motor has a magnetic saturation characteristic with respect to a rotor position, other types of AC electric motors can be also applied to the driving target.

The Iq* generator 1 is a control block which generates a torque current command Iq* of the PM motor 4 and corresponds to an upper controller of the controller 2. For example, the Iq* generator 1 functions as a speed controller which controls a rotation speed of the PM motor 4 or a block which operates a torque current command required from a state of a load device such as a pump and gives the command to the controller 2.

The controller 2 is a controller which controls a vector of the PM motor 4 without a rotor position sensor. The controller 2 has functions as both of "actual operation mode" for realizing a normal position-sensorless control and "measurement mode" for automatically performing adjustment operation to each of the PM motors before the actual operation. The controller 2 switches between operation of the actual operation mode and operation of measurement mode by a switch inside the block.

The controller 2 includes switches SW21a to SW21e which switch between the actual operation mode and the measurement mode. In the actual operation mode, the switches SW21a to SW21e are switched to "1" and in the measurement mode, the switches SW21a to SW21e are switched to "0". In the actual operation mode, position estimation based on the neutral point potential and a vector control system using current control of a dq axis are realized. In the measurement mode, a parameter required by a position estimator 15 during the actual operation mode is obtained by an algorithm described below.

The controller 2 includes a current reproducer 11 which reproduces three-phase alternating currents Iuc, Ivc, and Iwc based on a direct bus current of the inverter 3. In the present embodiment, the phase current is reproduced by detecting the direct bus current by the current detector 35, but a phase current sensor may be directly used. A detailed explanation for operation of the current reproducer 11 will be omitted.

The reproduced three-phase alternating currents Iuc, Ivc, and Iwc are converted to a value (Id, Id) of a dq coordinate axis which is a rotor coordinate axis of the PM motor 4 by a dq converter 12. A d axis current Id is input to a d axis current controller IdACR 7 via an adder 6. A q axis current Iq is input to a q axis current controller IqACR 8 via the adder 6.

The d axis current controller IdACR 7 performs the current control based on the d axis current Id and an excitation current command Id* to the PM motor 4. The Id* which is input when the current control is performed is switched by the switch SW21c. In the actual operation mode, a signal from an Id* generator 5a is used. In the measurement mode, a signal from an Id* generator 5b is used.

The q axis current controller IqACR 8 performs the current control based on the q axis current Iq and the q axis current command Iq*. The Iq* which is input when the current control is performed is switched by the switch SW21d. In the actual operation mode, a signal from an Iq* generator 1 is used. In the measurement mode, a zero generator 19 sets the Iq* to zero.

During the actual operation mode, a d axis voltage command Vd* output from the d axis current controller IdACR 7 and a q axis voltage command Vq* output from the q axis current controller IqACR 8 are input to a dq inverse converter 9. The dq inverse converter 9 converts the voltage commands Vd* and Vq* on the dq axis into three-phase AC voltage commands Vu0, Vv0, and Vw0. Then, a pulse width modulation (PWM) unit 10 generates a gate pulse signal which drives the inverter 3 based on the three-phase AC voltage command.

Determination of conversion phase used by the dq inverse converter 9 and the dq converter 12 will be described.

The controller 2 includes a neutral point potential amplifier 13. The neutral point potential amplifier 13 amplifies and detects a neutral point potential Vn of the PM motor 4 based on a virtual neutral point potential Vnc of the virtual neutral point potential generator 34. In the present embodiment, the neutral point potential is detected based on the virtual neutral point potential Vnc of the virtual neutral point potential generator 34, but a potential as a standard can be predetermined. For example, the neutral point potential also can be detected using another reference potential as a reference such as a ground level of the DC power supply 31 of the inverter 3 or the like.

A sample/holder 14 samples/holds the detected neutral point potential and captures the neutral point potential inside the controller. Then, the position estimator 15 estimation-operates the rotor position θdc of the PM motor 4 based on the detected neutral point potential Vn0 (actually one of VnA to VnF). During the actual operation mode, the estimated rotor position θdc is input to the dq inverse converter 9 and the dq converter 12. In addition, a speed operator 16 estimates a rotor speed ω1 based on the estimated rotor position θdc.

As described below, the control device of the present embodiment has characteristics of energizing an AC current to the PM motor 4 and obtaining current dependence of the neutral point potential Vn at that time. As a configuration for the characteristics, the control device of the AC electric motor according to the present embodiment includes an AC command generator 20 which applies an AC voltage Vh* to the dq inverse converter as a q axis voltage during the measurement mode.

The neutral point potential Vn0 detected during the measurement mode (that is, energization of the AC current) is input to an estimation parameter setter 18 by the switch SW21a. An estimation parameter setter 18 sets a parameter required for position estimation during the actual operation mode based on the neutral point potential Vn0.

In addition, the controller 2 includes a phase setter 17 which forcibly moves the rotor position to a predetermined position during the measurement mode During the measurement mode, the conversion phase input to the dq inverse converter 9 and the dq converter 12 is switched to a signal ouput from the phase setter 17 by the switch SW21b.

Then, the control device of the AC electric motor according to the present embodiment includes the AC command generator 20 which applies the AC voltage Vh* to the dq inverse converter as the q axis voltage during the measurement mode. Accordingly, current dependence of the neutral point potential is obtained by generating the AC current.

Next, a principle of position-sensorless driving based on the neutral point potential will be described with reference to FIGS. 2 to 7.

FIG. 2(a) is a diagram illustrating a vector display of an output voltage of the inverter on αβ coordinates. In FIG. 2(a), a numerical value "1, 0, 0" of V(1, 0, 0) indicates a switching state of U, V, and W phases of the inverter main circuit, "1" means turning on of an upper element, and "0" means turning on of a lower element For example, V(1, 0, 0) means the states in which the upper element of the U phase is turned on and the lower elements of the V phase and W phase are turned on. The output voltage of the inverter 3 becomes voltage patterns of eight types which are a sum of two zero vectors (V(0, 0, 0) and V(1, 1, 1)) and six non-zero vectors (VA to VF) according to the switching state of each of three-phase switching devices (Sup to Swn).

The inverter generates a sinusoidal pulse pattern using these eight voltage vectors. For example, for an arbitrary voltage command V*, assuming that the command is in a region 3 in FIG. 2(a), a voltage corresponding to the V* is generated by combining vectors VB and VC and a zero vector surrounding the region 3.

FIG. 2(b) is a diagram illustrating the rotor position θd of the PM motor on the αβ coordinates. The θd is normally defined in a counterclockwise direction based on an a axis (equal to a U-phase stator winding position).

FIG. 3(a) illustrates a stop point potential VnA when the voltage vector VA is applied and FIG. 3(b) illustrates a stop point potential VnD when the voltage vector VD is applied. The neutral point potential is represented by equations illustrated in FIGS. 3(a) and (b) based on a virtual neutral point potential. In this way, each of the neutral point potentials is observed as a divided potential of stator windings Lu, Lv, and Lw. If an inductance of each of the windings is equal with one another, the neutral point potential is completely zero. However, since a magnetic flux of the rotor actually affects the winding, the inductance has a change according to the rotor position. In the following description, VnA, VnB, VnC, VnD, VnE, and VnF are respectively used as names of the neutral point potentials generated when the voltage vectors VA, VB, VC, VD, VE, and VF are applied.

FIG. 4 illustrates a result of observing the neutral point potential by applying a voltage vector to the actual PM motor. Both of $V_{nA}$ and $V_{nD}$ have changes according to the rotor position. By using dependence of the neutral point potential for the rotor position, the rotor position can be estimated. In the present embodiment, the rotor position is estimation-operated using a part of the waveform of FIG. 4. FIGS. 5(a) to 5(c) are illustrated as examples of linearization focusing on the change of VnA in FIG. 4.

FIG. 5(a) illustrates a case where a change of VnA from −60 [deg] to 0 [deg] is regarded as a straight line and is made into a function as Vn=Fa (θd). When the position is estimated, it is possible to estimate the rotor position θd from Vn by using $\theta d = Fa^{-1}(Vn)$.

In order to realize this, two neutral point potentials with respect to the θd may be obtained. For example, the rotor is moved to −60 [deg] and the VA is applied to a position of the rotor to obtain the neutral point potential VnA0. Then, the rotor is moved to 0 [deg] and the VA is applied to a position of the rotor to obtain the neutral point potential VnA1.

FIG. 5(b) is another example of linearization different from FIG. 5(a). As illustrated in FIG. 5(b), it is also possible to approximate at a predetermined point in a range from −60 [deg] to 0 [deg].

Basically, the neutral point potential Vn0 (actually, any one of VnA to VnF) is input and linearization as represented by the following equation (1) is performed.

$$\theta dc60 = A1*Vn0 + B1 \tag{1}$$

FIG. 5(c) is still another example of linearization. A method illustrated in FIG. 5(c), the neutral point potentials of a plurality of points within a range of −60 [deg] to 0 [deg] are obtained. In this way, a plurality of A1 and B1 in the above equation may be prepared to improve estimation accuracy.

FIG. 6 illustrates an example of an observation result of VnA, VnB, VnC, VnD, VnE, and VnF which are six neutral point potentials. In FIG. 6, solid lines and dashed lines are mixed, but this is for easier recognition. If these six neutral point potentials are selected and used at each of the rotor positions with 60 degrees, the waveform as illustrated in FIG. 7 is obtained.

FIG. 7 is a diagram in which six types of neutral point potentials are selected for each of the rotor positions with 60 degrees. In this way, by using the six types of the neutral point potentials for each of the rotor positions with 60 degrees in order, a target waveform can be observed and the rotor position can be estimated by a simple algorithm. FIG. 7 illustrates an example for a method of selecting six types of the neutral point potentials.

The above algorithm explains a basic operation of position estimation using the neutral point potential. The basic operation uses position dependence of the neutral point potential changed according to a position of a magnet-magnetic flux. However, in the actual motor, there is a case where as another factor for determining a value of the neutral point potential, there is current dependence which is changed by the torque current.

FIG. 8 illustrates a result obtained by measuring the neutral point potential (here, VnA) while varying a value of the q axis current (that is, a current of a torque component) to 25%, 50%, 100%, and 200%. Here, the values of the neutral point potentials when the rotor positions θdc are −60 [deg], −30 [deg], and 0 [deg] are respectively VnA0, VnA1, and VnA2. For example, VnA0_025 is the value of the neutral point potential when the rotor position θdc is −60 [deg] and the q axis current is 25%.

Although degree of dependence is different depending on magnetic circuit characteristics of the motor, there is a case where current dependence as illustrated in FIG. 8 may occur. Accordingly, there is a possibility that an accurate position is not estimated with simple fitting as illustrated in FIG. 5 and a torque specification is not satisfied; and besides the position is not estimated.

In the present embodiment, as a factor for determining the value of the neutral point potential, by considering (1) not only position dependence changed by the position of the magnet-magnetic flux (2) but also current dependence changed by the torque current, the control device of the synchronous electric motor capable of high torque driving from a zero speed can be realized.

Next, a method of obtaining current dependence of the neutral point potential will be described. First, using FIG. 9(a), a relationship between a permanent magnet-magnetic flux Φm and the torque current Iq during normal driving will be described. As illustrated in FIG. 9(a), in normal driving, the torque current Iq flows in a direction orthogonal to the magnet-magnetic flux Φm and rotation power is obtained. A magnetic flux Φq due to the Iq is generated in a direction orthogonal to the magnet-magnetic flux Φm. As a result, a total magnetic flux Φ1 inside the motor is a magnetic flux obtained by combining the Φm and the Φq. For this reason, the neutral point potential is also changed by influence of the Φq, but degree of influence differs depending on design of the motor.

Therefore, if measurement of the neutral point potential is performed in a state in which the Iq is energized, it is possible to obtain current dependence, but since the motor generates rotation power by flowing the Iq, the rotor must be mechanically fixed and it is difficult to easily measure the neutral point potential.

In the present embodiment, as illustrated in FIG. 9(b), an alternating current (referred to as AC current) flows in a direction of ±90 degrees with respect to the magnet-magnetic flux Φm. If the Iq is not a constant current of a direct current but an alternating current, an average torque becomes zero and a high current can flow without generating rotation power.

Using FIG. 10, a principle for obtaining current dependence by flowing an AC current will be described. As illustrated in FIG. 10, a current of a d axis is at zero and an AC current of a q axis flows. The current is generated by applying the AC voltage Vh* generated by the AC command generator 20 in FIG. 1 as the q axis voltage Vq*. Since the alternating current is an AC current which does not form a rotating magnetic field, an average torque of the motor is zero.

In addition, in the present embodiment, as illustrated in FIG. 10(b), by gradually increasing an AC amplitude from zero, the rotor position of the motor is suppressed from moving. Although the current is the alternating current, if a high current is flowed to the q axis at once, there is a possibility that the rotor position may move due to the shock, but this is suppressed.

In addition, by gradually increasing the amplitude of the alternating current and obtaining the neutral point potential when a desired current value is reached, it is possible to obtain the current value and the neutral point potential value. That is, current dependence at a certain rotor position as illustrated in FIG. 8 can be obtained.

FIG. 11 illustrates a flow of "measurement mode" for obtaining the neutral point potential also including current dependence. Processes from (S1) to (S14) in FIG. 11 will be described.

In (S1), the SW21a to SW21d are set to a "0" side and only the SW21e is kept at a "1" side. Next, in (S2), the phase setter 17 outputs θdc=−60 [deg] and at the same time an output of the Id* generator 5b is set to I0. The I0 is a current value necessary for moving the rotor, but as a guide, the I0 may correspond to a rated current of the PM motor 4. By setting in (S2), a DC current is generated at a position of θdc=−60 [deg]. The rotor moves according to the current and stops at the position of θdc=−60 [deg]. Next, in (S3), SW21e is switched to "0" and the Id* is set to zero at the same time. At this point, the DC current is interrupted.

Next, in (S4), an AC voltage is gradually applied from an AC voltage generator 20 to obtain the neutral point potential VnA with respect to a peak value of the flowing AC current (waveform in FIG. 10). The VnA obtained at this time corresponds to VnA0_025 to VnA0_200 in FIG. 8 since the rotor position θd is −60 [deg].

In the same manner, by setting θdc=−30[deg] by the processes from (S5) to (S8), the current dependence VnA1_025 to VnA1_200 at the rotor position of −30 degrees is obtained. Then, by setting θdc=0 [deg] by the processes from (S9) to (S12), the current dependence VnA2_025 to VnA2_200 at the rotor position of 0 degree is obtained.

In (S13), an approximate function for interpolating the neutral point potential and the rotor position based on these neutral point potential values is calculated. In the present embodiment, a linear interpolation formula as illustrated in FIG. 5 is used as the approximation function and the coefficients A1 and B1 in the equation (1) are obtained for each of the rotor positions and the q axis current values. As a result, it is possible to create a table considering current dependence and to perform position estimation-operation with improved estimation accuracy.

Since the PM motor is in principle three-phase symmetric, if measurement is performed in a section of 60 degrees in an electrical angle, the result can be applied to other phases (as illustrated in FIG. 7, waveforms for each of 60 degrees are equal to one another).

For realizing the flow of FIG. 11, it is necessary to detect the VnA while flowing the alternating current in (S4), (S8), and (S12). That is, when the inverter 3 generates an alternating current on the q axis, it is necessary to surely include the VA as a voltage vector. This can be realized by devising a method of generating a pulse when the pulse width of the inverter is modulated. FIG. 12 illustrates an example of the pulse generation method.

As illustrated in FIG. 12(a), if the position of the voltage command V* is in a range of ±60 degrees, the VA is always output from the inverter. Therefore, as illustrated in FIG. 12(b), the VA is output by the PWM using the normal triangular wave carrier. When the voltage vector VA is output, by measuring the neutral point potential, it is possible to detect the VnA.

However, depending on a condition, there is also a possibility that an output period of the VA is extremely short or the VA is not output in a region other than ±60 degrees. In this case, "pulse shift" will be executed as illustrated in FIG. 12(c). The pulse shift adds correction without changing a total value of original voltage commands (Vu0, Vv0, and Vw0) in a falling section of the triangular wave carrier (period Tc1 in FIG. 12(c)) and a rising section (period Tc2 in FIG. 12(c)) and it is possible to output the voltage pulse of the VA by changing the amount of the shift. The pulse shift is executed by the PWM generator in FIG. 1.

FIG. 13 illustrates a configuration of the position estimator 15 which operates during the actual operation mode. In FIG. 13, the neutral point potential Vn0 is input and calculation of a rotation position is executed by using a multiplier 152 and the adder 6 according to the equation (1). Measurement values are saved in coefficient tables 1511 and 1512 so that values of A1 and B1 in equation (1) are corrected according to the current Iq. In the embodiment, although measurement is performed on currents at four points (25%, 50%, 100%, and 200%), by performing linear interpolation between the currents, it is possible to deal with a total current value. Alternatively, the number of the measurement points may be further increased to improve accuracy of the coefficient table.

θdc 60 is set so as to be calculated within a range of ±30 [deg], staircase waveform signals θdc 0 for each 60 degrees output by a θd reference value generator 153 are added to the θdc 60, and the estimated phase θdc of 0 to 360 [deg] is obtained.

As described above, the control device of the synchronous electric motor according to the present embodiment sets the PM motor with the three-phase stator windings Y-connected to a driving target and energizes the AC current which does not generate rotation power by the inverter before actual driving to obtain the neutral point potential (potential of Y connection point) of the PM motor according to magnitude of the energized current. By storing the obtained value in a non-volatile memory of the controller and executing the rotor position estimation of the PM motor based on the value, it is possible to realize the control device of the synchronous electric motor capable of high torque driving from a zero speed According to the present embodiment, it is possible to easily perform automatic adjustment on parameters necessary for the position-sensorless driving whatever PM motor is used and realize sensorless driving of a versatile PM motor.

Second Embodiment

Next, the control device of the synchronous electric motor according to the second embodiment of the invention will be described using FIGS. 14 and 15.

In the first embodiment, a method in which it is possible to deal with a PM motor of which characteristics are unknown by the simple adjustment algorithm is described. In the present embodiment, the device which solves a problem of three-phase imbalance in each of PM motors is provided.

In the first embodiment, for example, as illustrated in FIG. 6 and FIG. 7, the adjustment algorithm is configured assuming that the neutral point potential of each of voltage vectors is changed equally in detection characteristics of the neutral point potential. However, in the actual PM motor, three-phase imbalance often occurs due to a manufacturing error and material variation. In particular, the neutral point potential used in the present embodiment also detects an effect of minute change in inductance of each of phases, and this method is easily affected by imbalance.

FIG. 14 illustrates an appearance in which measurement results of the neutral point potential for six types of voltage vectors are dispersed. These are caused by three-phase imbalance of the motor itself and also include influence due to variations of a detection circuit (virtual neutral point generator 34 in FIG. 1) of the neutral point potential. However, in the first embodiment, the variation for each of the phases cannot be compensated in the measurement mode.

In the present embodiment, in order to solve these problems, the adjustment operation is executed for each of six types of the neutral point potentials. In the flow of FIG. 11, the neutral point potential from θd=−60° to θd=0° is measured, but the neutral point potential is measured in all regions of electrical angle 360°. That is, (S1) to (S13) in FIG. 11 are repeated six times to deal with 360 degrees. Using a measurement result of the neutral point potential, coefficient tables 1511B and 1512B inside a position estimator 15B illustrated in FIG. 15 are prepared for each of 60 degrees and the coefficient tables are switched using switches 154a and 154b.

As a result, the variation for each of three phases is compensated and it is possible to accurately operate the rotor phase θdc.

Third Embodiment

Next, the control device of the synchronous electric motor according to the third embodiment of the invention will be described using FIG. 16.

In the first and second embodiments, as the rotor phase, the position estimation is performed by dividing electrical angle of 360 degrees for each of 60 degrees with reference to zero degrees. However, a waveform of the detected neutral point potential is not a target in each of 60-degree periods and an error in linear approximation becomes large. Naturally, as illustrated in FIG. 5(c), although it is possible to obtain some reference points and approximate the points by a polygonal line, the process becomes complicated and operation time in the measurement mode also becomes long.

The third embodiment according to the invention solves this problem.

FIG. 16 illustrates a comparison on principles of the embodiment (FIG. 16(a)) and the embodiment (FIG. 16(b)). For example, if a 60-degree period for detecting the VnA is set to a range of −60 degrees to 0 degrees, a large error occurs in some parts. In the present embodiment, as illustrated in FIG. 16(b), linearization is executed in a range of −75 degrees to −15 degrees by shifting by 15 degrees. Accordingly, the detected VnA becomes a symmetrical waveform and the error in the linear approximation is greatly reduced. Even if an angle of deviation is not 15 degrees, the same effect can naturally be expected if the angle is near to 15 degrees.

The flow in the measurement mode of this method only changes a setting of the phase θd in the flow of FIG. 11. For example, in the process of (S2) in FIG. 11, θdc=−60 degrees may be set as θdc=−75 degrees. Furthermore, the embodiment can be realized by deleting (S5) to (S8) and setting θdc=0 degrees to θdc=−15 degrees in (S9). The corrected flow is illustrated in FIG. 17.

As described above, by shifting the rotor position in the measurement mode by 15 degrees, it is possible to realize sensorless driving capable of more highly accurate position estimation. Regarding three-phase imbalance, it is possible to realize the sensorless driving in the exactly same manner by executing based on the second embodiment and shifting the moving position of the rotor in the measurement mode by 15 degrees.

Fourth Embodiment

Next, the control device of the synchronous electric motor according to the fourth embodiment of the invention will be described using FIG. 18.

As described in the previous embodiments, by obtaining the neutral point potential of a predetermined phase in the measurement mode, it is possible to drive the PM motor with a high response and high quality (low torque pulsation, low loss, or the like). However, when the motor is combined with the controller, the measurement mode is executed only once as an initial work and cannot deal with a temporal change of the motor characteristics. In principle, although the PM motor is a motor with little change over time, there is a possibility that a temperature of the motor may change from several tens degrees to approximately 100 degrees during driving. Due to the temperature change, the characteristics of the permanent magnet attached to the rotor are changed and the neutral point potential may fluctuate as a result. In particular, the measurement mode is a first-time operation mode and there is a high possibility of adjusting under a condition in which the temperature of the PM motor is low. On the other hand, if the PM motor is driven in the actual operation mode, the motor main body generates heat due to a copper loss and an iron loss and there is a possibility that the characteristics of the motor main body may be different from the characteristics in the measurement mode.

Therefore, detection of the neutral point potential in the measurement mode is preferably executed as close as possible to a temperature condition in the actual operation mode.

Therefore, as illustrated in FIG. 18, new processes (P1) and (P2) are added to the measurement mode algorithm (FIG. 9) of the first embodiment. In (P1), the SW21a to the SW21d are temporarily set to the measurement mode, $I_0$ is changed to a predetermined value and the phase $\theta_{dc}$ is changed to 0 [deg], 120 [deg], and −120 [deg] in order in (P2), and the PM motor 4 is energized. The energization in (P2) is to generate the copper loss due to an electric current so as to increase the temperature of the motor to a value close to the actual operation and energization patterns may be arbitrary. However, the energizing phase may be changed so that the current does not concentrate in a specific phase.

If the measurement mode described in the above embodiments is executed after energizing the PM motor 4 by (P2), the neutral point potential at a temperature condition close to the actual operation can be obtained.

As described above, according to the fourth embodiment of the invention, it is possible to obtain the neutral point potential close to the actual operation temperature condition in the measurement mode and to improve position estimation accuracy of the actual operation.

Fifth Embodiment

Next, the fifth embodiment of the invention will be described.

FIG. 19 is an actual diagram illustrating a driving system of the synchronous electric motor according to the embodiment. In FIG. 19, a synchronous electric motor driving system 23 is packaged inside the motor 4 as one system. By integrating all of the synchronous electric motor driving system 23 and the motor 4 in this manner, wiring between the motor and the inverter can be eliminated. As illustrated in FIG. 19, wiring of the integrated driving system is only a power supply line to the inverter 3 and a communication line for a rotation speed command, returning the operation state, or the like.

In the embodiment, although it is necessary to derive the neutral point potential of the motor 4, by integrating the motor and the drive circuit portion in this manner, the wiring of the neutral point potential becomes easy. In addition, since the position sensorlessness driving can be realized, the integrated system can be extremely compact and miniaturization can be realized.

Sixth Embodiment

Next, the sixth embodiment of the invention will be described.

FIG. 20 is a hydraulic driving system used for transmission hydraulic pressure inside an automobile, brake hydraulic pressure, and the like. In FIG. 20, a component number 23 is the synchronous electric motor driving system in FIG. 19 and an oil pump 24 is attached to the motor. By the oil pump 24, hydraulic pressure of a hydraulic pressure circuit is controlled. The hydraulic pressure circuit 50 is configured to include a tank 51 which stores oil, a relief valve 52 which keeps hydraulic pressure below a set value, a solenoid valve 53 which switches the hydraulic pressure circuit, and a cylinder 54 which operates as a hydraulic actuator.

The oil pump 24 generates hydraulic pressure by the synchronous electric motor driving system 23 and drives the cylinder 54 which is the hydraulic actuator. In the hydraulic pressure circuit, by switching the circuit by the solenoid valve 53, a load of the oil pump 24 is changed and turbulence other than the load is generated in the synchronous electric motor driving system 23. In the hydraulic pressure circuit, a load equal to or more than several times may be applied to steady state pressure and the motor may be stopped. However, in the synchronous electric motor driving system according to the embodiment, it is possible to estimate the rotor position even in a stop state, so that no problem occurs. With sensorlessness described above, since it is difficult to apply only in a middle to high speed range, it is indispensable to relieve hydraulic pressure which becomes a heavy load of the motor by the relief valve 52, but according to the present embodiment, it is also possible to eliminate the relief valve 52 as illustrated in FIG. 21. That is, hydraulic pressure control becomes possible without the relief valve which is a mechanical protection device for avoiding overload to the motor.

Although this embodiment is described as the hydraulic pressure control system, it is also applicable to another liquid pump as well.

Seventh Embodiment

Next, the seventh embodiment of the invention will be described.

FIG. 22 illustrates a positioning device using the motor and an entire block configuration of the positioning device. In FIG. 22, the positioning device 70 is connected as a load of the motor 4. Here, an Iq* generator 1E functions as a speed controller. In addition, a speed command ωr* is provided as an output of a position controller 71 which is an upper control block. A subtractor 6E compares the speed command ωr* with an actual speed ωr and operates the Iq* so that deviation becomes zero. The positioning device 70 is a device using, for example, a ball screw and is adjusted by the position controller 71 so that the position is controlled to be a predetermined position θ*. The position sensor is not attached to the positioning device 70 and the position estimation value θdc in the controller 2 is used as it is. Thereby, there is no need to attach the position sensor to the positioning device and position control can be performed.

Although the invention has been specifically described based on the embodiment, the invention is not limited to the above embodiment, and various modifications can be made without departing from a gist thereof.

As described above, the invention is a technology for constructing the control device of the synchronous electric motor on the premise of the position-sensorlessness and a driving system using the control device. An application range of this motor can be used as a conveyor, an elevator, an extruder, a machine tool as well as rotational speed control of a fan, a pump (hydraulic pumps, water pumps), a compressor, a spindle motor, an air conditioner, and the like.

The disclosure content of the following priority application is incorporated herein as a quotation. Japanese Patent Application No. 2015-199040 (Oct. 7, 2015)

REFERENCE SIGNS LIST

1 . . . Iq* generator
2 . . . controller
3 . . . inverter
31 . . . DC power supply
32 . . . inverter main circuit
33 . . . gate driver
34 . . . virtual neutral point potential generator
35 . . . current detector
4 . . . PM motor
5 . . . Id* generator
6 . . . adder
6, 7 . . . d axis current controller IdACR
8 . . . q axis current controller IqACR
9 . . . dq inverse converter
10 . . . pulse width modulation unit
11 . . . current reproducer
12 . . . dq converter
13 . . . neutral point potential amplifier
14 . . . sample/holder
15 . . . position estimator
16 . . . speed operator
17 . . . phase setter
18 . . . estimation parameter setter
19 . . . zero generator
20 . . . AC command generator
21 . . . switch

The invention claimed is:

1. A control device of a synchronous electric motor, which controls the synchronous electric motor using an inverter, the device comprising:
the synchronous electric motor with three-phase stator windings Y-connected;
a detection unit that detects a neutral point potential which is a potential at a Y connection point; and
the inverter that drives the synchronous electric motor, wherein the control device of the synchronous electric motor includes a measurement mode in which the neutral point potential is detected in a state in which the synchronous electric motor is energized by an AC current via an AC voltage generator and controls the synchronous electric motor based on a value of the neutral point potential detected in the measurement mode, and
wherein during driving when the synchronous electric motor is normally driven after the neutral point potential is detected in the measurement mode by applying a voltage pulse for neutral point potential detection by the inverter, a rotation position of the synchronous electric motor is estimation-operated from a value of the detection and a value of the detected neutral point potential in advance, and the synchronous electric motor is driven based on the rotation position.

2. The control device of the synchronous electric motor according to claim 1,
wherein before the neutral point potential is detected by the AC current in the measurement mode the synchronous electric motor is energized by a direct current to move a rotor.

3. The control device of the synchronous electric motor according to claim 2,
wherein energization by the direct current and detection of the neutral point potential by the AC current are repetitively executed at a plurality of positions of the rotor.

4. The control device of the synchronous electric motor according to claim 3,
wherein a plurality of movement ranges of the rotor by the energization by the direct current are a plurality of points within a range of at least 60 degrees with respect to an electrical angle of the synchronous electric motor.

5. The control device of the synchronous electric motor according to claim 3,
wherein a plurality of movement ranges of the rotor by the energization by the direct current are a plurality of points within a range of 360 degrees with respect to the electrical angle of the synchronous electric motor.

6. The control device of the synchronous electric motor according to claim 3,
wherein a plurality of movement ranges of the rotor by the energization by the direct current are a plurality of points at intervals of 60 degrees with reference to a phase shifted by 15 degrees, where a position of a U-phase stator winding is defined as the zero degree of an electrical angle phase.

7. The control device of the synchronous electric motor according to claim 1,
wherein the AC current for energizing the synchronous electric motor energizes the synchronous electric motor while an amplitude of the AC current being changed.

8. The control device of the synchronous electric motor according to claim 7,
wherein a maximum amplitude value of the AC current for energizing the synchronous electric motor is at least equal to or larger than magnitude of the current during normal driving of the synchronous electric motor.

9. The control device of the synchronous electric motor according to claim 7,
wherein the amplitude of the AC current for energizing the synchronous electric motor gradually increases from zero.

10. The control device of the synchronous electric motor according to claim 1, wherein when the measurement mode is executed, after the synchronous electric motor is energized in advance, the neutral point potential is detected.

11. The control device of the synchronous electric motor according to claim 1,
wherein the voltage pulse for the neutral point potential detection output during normal driving of the synchronous electric motor is applied to at least one of an upward period and a downward period of a triangular wave carrier wave with respect to the triangular wave carrier wave when a pulse width of the inverter is modulated to detect the neutral point potential, and the rotation position is estimated based on a value of the detection.

12. The control device of the synchronous electric motor according to claim 1,
wherein rotor position estimation of the synchronous electric motor is operated by a function based on the detected neutral point potential in advance.

13. An integrated electric motor system comprising:
the control device of the synchronous electric motor according to claim 1; and
a rotor and a stator of the synchronous electric motor, driven by the control device of the synchronous electric motor, stored in a common housing.

14. A pump system comprising:
the control device of the synchronous electric motor according to claim 1;
the synchronous electric motor driven by the control device of the synchronous electric motor; and
a pump for liquid driven by the synchronous electric motor.

15. A positioning system which moves an object with the control device of the synchronous electric motor according to claim 1; and
the synchronous electric motor driven by the control device of the synchronous electric motor and the electric motor and controls a position of the object.

16. A control device of a synchronous electric motor, which controls the synchronous electric motor using an inverter, the device comprising:
the synchronous electric motor with three-phase stator windings Y-connected;
a detection unit that detects a neutral point potential which is a potential at a Y connection point; and
the inverter that drives the synchronous electric motor,
wherein the control device of the synchronous electric motor includes a measurement mode in which the neutral point potential is detected in a state in which the synchronous electric motor is energized by an AC current via an AC voltage generator and controls the synchronous electric motor based on a value of the neutral point potential detected in the measurement mode,
wherein before the neutral point potential is detected by the AC current in the measurement mode the synchronous electric motor is energized by a direct current to move a rotor,
wherein energization by the direct current and detection of the neutral point potential by the AC current are repetitively executed at a plurality of positions of the rotor, and
wherein a plurality of movement ranges of the rotor by the energization by the direct current are a plurality of points within a range of 360 degrees with respect to the electrical angle of the synchronous electric motor.

* * * * *